(12) United States Patent
Sengupta et al.

(10) Patent No.: US 12,127,216 B2
(45) Date of Patent: Oct. 22, 2024

(54) DOWNLINK CONTROL INFORMATION FOR SCHEDULING ONE OR MORE TRANSPORT BLOCKS

(71) Applicant: Qualcomm Incorporated, San Diego, CA (US)

(72) Inventors: Ayan Sengupta, San Diego, CA (US); Chao Wei, Beijing (CN); Alberto Rico Alvarino, San Diego, CA (US); Le Liu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 17/765,233

(22) PCT Filed: Nov. 18, 2019

(86) PCT No.: PCT/CN2019/119110
§ 371 (c)(1),
(2) Date: Mar. 30, 2022

(87) PCT Pub. No.: WO2021/062925
PCT Pub. Date: Apr. 8, 2021

(65) Prior Publication Data
US 2023/0156718 A1    May 18, 2023

(30) Foreign Application Priority Data
Oct. 4, 2019   (WO) ................. PCT/CN2019/109824

(51) Int. Cl.
*H04W 72/23*    (2023.01)
*H04L 1/1812*   (2023.01)

(52) U.S. Cl.
CPC ........... *H04W 72/23* (2023.01); *H04L 1/1819* (2013.01)

(58) Field of Classification Search
CPC ............................. H04W 72/23; H04L 1/1819
(Continued)

(56) References Cited

U.S. PATENT DOCUMENTS 10,673,593 B2 *   6/2020   Cao ..................... H04L 1/1614
2011/0075684 A1   3/2011   Zeng et al.
(Continued)

FOREIGN PATENT DOCUMENTS

CN   107534529 A   1/2018
CN   109428668 A   3/2019
(Continued)

OTHER PUBLICATIONS

Ericsson: "Feature Lead Summary for Scheduling of Multiple DL/UL Transport Blocks for LTE-MTC", 3GPP TSG-RAN WG1 Meeting #96, R1-1903245, Athens, Greece, Feb. 25-Mar. 1, 2019, Mar. 1, 2019 (Mar. 1, 2019), pp. 1-12, the whole document.
(Continued)

*Primary Examiner* — Nghi H Ly
(74) *Attorney, Agent, or Firm* — Holland & Hart LLP

(57) ABSTRACT

Methods, systems, and devices for wireless communications are described. Techniques are described herein for encoding downlink control information (DCI) based on the number of transport blocks being scheduled by the DCI. The number of transport blocks supported by the DCI may be indicated explicitly using a field included in the DCI. The number of transport blocks can be implicitly signaled in a bitstream of the DCI block. The type of encoding scheme may be based on the coverage enhancement (CE) mode associated with a user equipment.

35 Claims, 16 Drawing Sheets

(58) Field of Classification Search
USPC .......... 370/329, 328, 338, 341, 345, 350
See application file for complete search history.

(56) References Cited

U.S. PATENT DOCUMENTS

| | | | |
|---|---|---|---|
| 2016/0100422 A1 | 4/2016 | Papasakellariou et al. | |
| 2018/0270807 A1* | 9/2018 | Salem | H04W 72/0446 |
| 2019/0149365 A1* | 5/2019 | Chatterjee | H04L 25/0226 370/329 |
| 2019/0327115 A1* | 10/2019 | Zhang | H04W 72/23 |

FOREIGN PATENT DOCUMENTS

| | | |
|---|---|---|
| EP | 3595386 A1 | 1/2020 |
| EP | 3968555 A1 | 3/2022 |
| WO | WO-2018071104 A1 | 4/2018 |
| WO | WO-2018175896 A1 | 9/2018 |
| WO | WO-2020118632 A1 | 6/2020 |

OTHER PUBLICATIONS

International Search Report and Written Opinion—PCT/CN2019/109824—ISAEPO—Jun. 23, 2020.
International Search Report and Written Opinion—PCT/CN2019/119110—ISAEPO—Jun. 29, 2020.
Qualcomm Incorporated: "Scheduling of Multiple DL/UL Transport Blocks", 3GPP TSG RAN WG1 Meeting #98, R1-1908827, Prague, Czech Republic, Aug. 26-Aug. 30, 2019, Aug. 17, 2019 (Aug. 17, 2019), pp. 1-18, Section 1-10.
Qualcomm Incorporated: "Scheduling of Multiple DL/UL Transport Blocks", 3GPP TSG RAN WG1 Meeting #98b, R1-1910718, Chongqing, China, Oct. 14-Oct. 20, 2019, Oct. 5, 2019, (Oct. 5, 2019), pp. 1-17, Section 1-7.
Qualcomm Incorporated: "Scheduling of Multiple DL/UL Transport Blocks", 3GPP TSG RAN WG1 Meeting #99, R1-1912679, Reno, USA, Nov. 18-Nov. 22, 2019, Nov. 9, 2019 (Nov. 9, 2019), pp. 1-16, Section 2-3.
ZTE: "Summary on Multiple TB scheduling enhancement for NB-Iot", 3GPP TSG-RAN WG1 Meeting #95, R1-1813713, Spokane, USA, Nov. 12-16, 2018, Nov. 13, 2018 (Nov. 13, 2018), 11 Pages, the whole document.
Samsung: "Scheduling of Multiple Transport Blocks for MTC", 3GPP TSG RAN WG1 Meeting #96, R1-1902211, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019 Mar. 1, 2019, Feb. 15, 2019, 6 Pages, XP051599906, Section 3.
Supplementary European Search Report—EP19948031—Search Authority—Munich—Sep. 15, 2023.
ZTE: "Summary on Multiple TB Scheduling Enhancement for NB-Iot", 3GPP TSG RAN WG1 Meeting #96, R1-1903257, 3rd Generation Partnership Project, Mobile Competence Centre, 650, Route Des Lucioles, F-06921 Sophia-Antipolis Cedex, France, Feb. 27, 2019, pp. 1-14, XP051600952, pp. 5,7,8,10.

* cited by examiner

DOWNLINK CONTROL INFORMATION FOR SCHEDULING ONE OR MORE TRANSPORT BLOCKS

CROSS REFERENCE TO RELATED APPLICATIONS

The present application is a 371 national stage filing of International PCT Application No. PCT/CN2019/119110 by Sengupta et. al., entitled "DOWNLINK CONTROL INFORMATION FOR SCHEDULING ONE OR MORE TRANSPORT BLOCKS," filed Nov. 18, 2019, and claims priority to International Patent Application No. PCT/CN2019/109824 by Sengupta et. al., entitled "DOWNLINK CONTROL INFORMATION FOR SCHEDULING ONE OR MORE TRANSPORT BLOCKS," filed Oct. 4, 2019, each of which is assigned to the assignee hereof, and each of which is expressly incorporated by reference in its entirety herein.

FIELD OF TECHNOLOGY

The following relates generally to wireless communications and more specifically to downlink control information for scheduling one or more transport blocks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Downlink control information may be used to schedule transport blocks for uplink communications or downlink communications. Signaling efficiency and overhead can be improved by controlling the amount of information in the downlink control information.

SUMMARY

The described techniques relate to improved methods, systems, devices, and apparatuses that support downlink control information for scheduling one or more transport blocks. Generally, the described techniques provide for encoding or decoding downlink control information (DCI) based on the number of transport blocks being scheduled by the DCI. The number of transport blocks supported by the DCI may be indicated explicitly using a field included in the DCI. The number of transport blocks can be implicitly signaled in a bitstream of the DCI block. The type of encoding scheme may be based on the coverage enhancement (CE) mode associated with a user equipment (UE).

A method for wireless communications at a UE is described. The method may include receiving a downlink control information block including downlink control information for one or more transport blocks scheduled for the UE, identifying an encoding scheme used to encode the downlink control information block based on a bitstream of the downlink control information block, where the encoding scheme is associated with a numerical quantity of the one or more transport blocks, decoding the downlink control information block to obtain the downlink control information for the one or more transport blocks based on the identified encoding scheme, and receiving the one or more transport blocks from a base station based on the downlink control information.

An apparatus for wireless communications at a UE is described. The apparatus may include a processor, memory in electronic communication with the processor, and instructions stored in the memory. The instructions may be executable by the processor to cause the apparatus to receive a downlink control information block including downlink control information for one or more transport blocks scheduled for the UE, identify an encoding scheme used to encode the downlink control information block based on a bitstream of the downlink control information block, where the encoding scheme is associated with a numerical quantity of the one or more transport blocks, decode the downlink control information block to obtain the downlink control information for the one or more transport blocks based on the identified encoding scheme, and receive the one or more transport blocks from a base station based on the downlink control information.

Another apparatus for wireless communications at a UE is described. The apparatus may include means for receiving a downlink control information block including downlink control information for one or more transport blocks scheduled for the UE, means for identifying an encoding scheme used to encode the downlink control information block based on a bitstream of the downlink control information block, where the encoding scheme is associated with a numerical quantity of the one or more transport blocks, means for decoding the downlink control information block to obtain the downlink control information for the one or more transport blocks based on the identified encoding scheme, and means for receiving the one or more transport blocks from a base station based on the downlink control information.

A non-transitory computer-readable medium storing code for wireless communications at a UE is described. The code may include instructions executable by a processor to receive a downlink control information block including downlink control information for one or more transport blocks scheduled for the UE, identify an encoding scheme used to encode the downlink control information block based on a bitstream of the downlink control information block, where the encoding scheme is associated with a numerical quantity of the one or more transport blocks, decode the downlink control information block to obtain the downlink control information for the one or more transport blocks based on the identified encoding scheme, and receive the one or more transport blocks from a base station based on the downlink control information.

Some examples of the method, apparatuses, and non-transitory computer-readable medium described herein may further include operations, features, means, or instructions for determining the numerical quantity of the one or more transport blocks associated with the downlink control information block, where identifying the encoding scheme may be based on determining the numerical quantity.

Some examples of the method, apparatuses, and non-transitory computer-readable medium described herein may further include operations, features, means, or instructions for determining a set of transport blocks including one or more numerical quantities of transport blocks associated with the downlink control information block, where identifying the encoding scheme may be based on determining the set of transport blocks.

Some examples of the method, apparatuses, and non-transitory computer-readable medium described herein may further include operations, features, means, or instructions for identifying a field of the downlink control information block that indicates the encoding scheme, where identifying the encoding scheme may be based on the field.

Some examples of the method, apparatuses, and non-transitory computer-readable medium described herein may further include operations, features, means, or instructions for determining the encoding scheme or the numerical quantity implicitly from the downlink control information block for indicating one or more configurations about the one or more transport blocks, where identifying the numerical quantity may be based on determining the encoding scheme from the downlink control information block.

In some examples of the method, apparatuses, and non-transitory computer-readable medium described herein, the downlink control information block uniquely determines the numerical quantity of transport blocks.

In some examples of the method, apparatuses, and non-transitory computer-readable medium described herein, the one or more fields of the downlink control information for determining the encoding scheme may be jointly decoded according to the encoding scheme, where each possible output of the encoding scheme corresponds to a jointly valid combination of the one or more fields.

Some examples of the method, apparatuses, and non-transitory computer-readable medium described herein may further include operations, features, means, or instructions for identifying a coverage enhancement mode of the UE, where decoding the downlink control information block to obtain the downlink control information may be based on the coverage enhancement mode of the UE.

Some examples of the method, apparatuses, and non-transitory computer-readable medium described herein may further include operations, features, means, or instructions for identifying a redundancy version for the one or more transport blocks indicated in the downlink control information based on the identified encoding scheme, where receiving the one or more transport blocks may be based on identifying the redundancy version.

In some examples of the method, apparatuses, and non-transitory computer-readable medium described herein, the redundancy version indicated in the downlink control information includes a common redundancy version for the one or more transport blocks based on the numerical quantity.

Some examples of the method, apparatuses, and non-transitory computer-readable medium described herein may further include operations, features, means, or instructions for determining that the downlink control information does not include a field to indicate the redundancy version based on the encoding scheme, where identifying the redundancy version includes identifying a default redundancy version.

Some examples of the method, apparatuses, and non-transitory computer-readable medium described herein may further include operations, features, means, or instructions for identifying a field of the downlink control information to indicate a frequency hopping configuration for the one or more transport blocks based on the encoding scheme, where receiving the one or more transport blocks may be based on the frequency hopping configuration indicated by the downlink control information.

Some examples of the method, apparatuses, and non-transitory computer-readable medium described herein may further include operations, features, means, or instructions for determining that the downlink control information does not include a field to indicate a frequency hopping configuration for the one or more transport blocks based at least in part on the encoding scheme, and identifying the frequency hopping configuration for the one or more transport blocks based at least in part on a radio resource configuration of the UE, where receiving the one or more transport blocks is based at least in part on identifying the redundancy version.

Some examples of the method, apparatuses, and non-transitory computer-readable medium described herein may further include operations, features, means, or instructions for identifying a second numerical quantity of bits of the downlink control information for indicating a modulation and coding scheme of the one or more transport blocks based on the encoding scheme associated with the downlink control information block, and identifying the modulation and coding scheme of the one or more transport blocks based on the second numerical quantity of bits, where receiving the one or more transport blocks may be based on identifying the modulation and coding scheme.

In some examples of the method, apparatuses, and non-transitory computer-readable medium described herein, a range of possible modulation and coding scheme configurations associated with the one or more transport blocks may be based on the second numerical quantity of bits of the downlink control information for indicating the modulation and coding scheme.

Some examples of the method, apparatuses, and non-transitory computer-readable medium described herein may further include operations, features, means, or instructions for identifying one or more hybrid automatic repeat request processes associated with the one or more transport blocks based on a combinatorial number indicated by the downlink control information, the combinatorial number indicating a single combination of the one or more hybrid automatic repeat request processes with the encoding scheme.

In some examples of the method, apparatuses, and non-transitory computer-readable medium described herein, at least one field of the downlink control information block may be jointly decoded according to the encoding scheme, where each possible output of the encoding scheme corresponds to a jointly valid combination of at least two parameters. In some examples of the method, apparatuses, and non-transitory computer-readable medium described herein, jointly decoding the at least one field of the downlink control information block is independent of the numerical quantity of the one or more transport blocks.

Some examples of the method, apparatuses, and non-transitory computer-readable medium described herein may further include operations, features, means, or instructions for decoding, jointly according to the encoding scheme, a field of the downlink control information block to identify a first parameter indicating a hybrid automatic repeat request configuration and a second parameter indicating a new data indicator, where decoding the downlink control information block may be based on decoding the field.

Some examples of the method, apparatuses, and non-transitory computer-readable medium described herein may further include operations, features, means, or instructions for decoding, jointly accordingly to the encoding scheme, a field to identify a first parameter indicating a modulation and coding scheme configuration and a second parameter indicating a repetition number, where decoding the downlink control information block may be based on decoding the field.

In some examples of the method, apparatuses, and non-transitory computer-readable medium described herein, the at least one field of the downlink control information block that may be jointly decoded includes a combinatorial index mapping for at least two parameters associated with the one or more transport blocks. In some examples of the method, apparatuses, and non-transitory computer-readable medium described herein, jointly decoding the at least one field of the downlink control information block is independent of the numerical quantity of the one or more transport blocks.

Some examples of the method, apparatuses, and non-transitory computer-readable medium described herein may further include operations, features, means, or instructions for applying the at least one field of the downlink control information block that may be jointly decoded to a combinatorial algorithm to determine a first configuration and a second configuration indicated by the at least one field.

Some examples of the method, apparatuses, and non-transitory computer-readable medium described herein may further include operations, features, means, or instructions for identifying a value of a field of the downlink control information block that indicates the numerical quantity of the one or more transport blocks scheduled by the downlink control information, where identifying the encoding scheme may be based on identifying the value of the field.

In some examples of the method, apparatuses, and non-transitory computer-readable medium described herein, the field may be different lengths for different numerical quantities of the one or more transport blocks scheduled by the downlink control information.

In some examples of the method, apparatuses, and non-transitory computer-readable medium described herein, the field includes a prefix-free encoded value for a first portion of the numerical quantities of the one or more transport blocks scheduled by the downlink control information, and the field includes a non-prefix-free encoded value for a second portion of the numerical quantities of the one or more transport blocks scheduled by the downlink control information.

Some examples of the method, apparatuses, and non-transitory computer-readable medium described herein may further include operations, features, means, or instructions for identifying that the value of the field includes a non-prefix-free encoding value, and identifying a value of one or more bits outside of the field based on identifying that the value of the field includes the non-prefix-free encoding value, where identifying the encoding scheme may be based on identifying the value of the one or more bits outside of the field.

Some examples of the method, apparatuses, and non-transitory computer-readable medium described herein may further include operations, features, means, or instructions for identifying that a first bit of the value of the field includes a first value, where identifying that the value of the field includes the non-prefix-free encoding value based on identifying that the first bit of the value of the field includes the first value.

In some examples of the method, apparatuses, and non-transitory computer-readable medium described herein, the one or more bits may be part of a field indicating a hybrid automatic repeat request configuration.

A method for wireless communications at a base station is described. The method may include determining a numerical quantity of one or more transport blocks for a UE scheduled by downlink control information, selecting an encoding scheme for the downlink control information based on the numerical quantity of the one or more transport blocks associated with the downlink control information, encoding the downlink control information into a downlink control information block for the one or more transport blocks based on the encoding scheme, transmitting, to the UE, the downlink control information block for the one or more transport blocks to the UE, and transmitting the one or more transport blocks to the UE based on the downlink control information.

An apparatus for wireless communications at a base station is described. The apparatus may include a processor, memory in electronic communication with the processor, and instructions stored in the memory. The instructions may be executable by the processor to cause the apparatus to determine a numerical quantity of one or more transport blocks for a UE scheduled by downlink control information, select an encoding scheme for the downlink control information based on the numerical quantity of the one or more transport blocks associated with the downlink control information, encode the downlink control information into a downlink control information block for the one or more transport blocks based on the encoding scheme, transmit, to the UE, the downlink control information block for the one or more transport blocks to the UE, and transmit the one or more transport blocks to the UE based on the downlink control information.

Another apparatus for wireless communications at a base station is described. The apparatus may include means for determining a numerical quantity of one or more transport blocks for a UE scheduled by downlink control information, means for selecting an encoding scheme for the downlink control information based on the numerical quantity of the one or more transport blocks associated with the downlink control information, means for encoding the downlink control information into a downlink control information block for the one or more transport blocks based on the encoding scheme, means for transmitting, to the UE, the downlink control information block for the one or more transport blocks to the UE, and means for transmitting the one or more transport blocks to the UE based on the downlink control information.

A non-transitory computer-readable medium storing code for wireless communications at a base station is described. The code may include instructions executable by a processor to determine a numerical quantity of one or more transport blocks for a UE scheduled by downlink control information, select an encoding scheme for the downlink control information based on the numerical quantity of the one or more transport blocks associated with the downlink control information, encode the downlink control information into a downlink control information block for the one or more transport blocks based on the encoding scheme, transmit, to the UE, the downlink control information block for the one or more transport blocks to the UE, and transmit the one or more transport blocks to the UE based on the downlink control information.

Some examples of the method, apparatuses, and non-transitory computer-readable medium described herein may further include operations, features, means, or instructions for identifying a value of a field of the downlink control information for indicating the numerical quantity, where encoding the downlink control information into the downlink control information block may be based on identifying the value.

In some examples of the method, apparatuses, and non-transitory computer-readable medium described herein, the field may be different lengths for different numerical quantities of the one or more transport blocks scheduled by the downlink control information.

In some examples of the method, apparatuses, and non-transitory computer-readable medium described herein, the field includes a prefix-free encoded value for a first portion of the numerical quantities of the one or more transport blocks scheduled by the downlink control information, and the field includes a non-prefix-free encoded value for a second portion of the numerical quantities of the one or more transport blocks scheduled by the downlink control information.

Some examples of the method, apparatuses, and non-transitory computer-readable medium described herein may further include operations, features, means, or instructions for identifying that the value of the field includes a non-prefix-free encoding value, and shifting a value of a parameter indicating a hybrid automatic repeat request configuration based on identifying that the value of the field includes a non-prefix-encoding value, where selecting the encoding scheme may be based on shifting the value of the parameter.

Some examples of the method, apparatuses, and non-transitory computer-readable medium described herein may further include operations, features, means, or instructions for identifying a value for one or more fields of the downlink control information for indicating one or more configurations about the one or more transport blocks based on the numerical quantity and one or more desired configurations of the one or more transport blocks, where encoding the downlink control information into the downlink control information block may be based on identifying the value.

Some examples of the method, apparatuses, and non-transitory computer-readable medium described herein may further include operations, features, means, or instructions for identifying a coverage enhancement mode associated with the UE, where selecting the encoding scheme for the downlink control information may be based on the coverage enhancement mode associated with the UE.

Some examples of the method, apparatuses, and non-transitory computer-readable medium described herein may further include operations, features, means, or instructions for identifying a redundancy version for the one or more transport blocks to indicate in the downlink control information based on the numerical quantity of the one or more transport blocks, where encoding the downlink control information may be based on identifying the redundancy version.

In some examples of the method, apparatuses, and non-transitory computer-readable medium described herein, the redundancy version indicated in the downlink control information includes a common redundancy version for the one or more transport blocks based on the numerical quantity.

Some examples of the method, apparatuses, and non-transitory computer-readable medium described herein may further include operations, features, means, or instructions for omitting an indicator of a redundancy version from the downlink control information based on the numerical quantity, where encoding the downlink control information may be based on omitting the indicator of the redundancy version from the downlink control information.

Some examples of the method, apparatuses, and non-transitory computer-readable medium described herein may further include operations, features, means, or instructions for identifying a field of the downlink control information to indicate a frequency hopping configuration for the one or more transport blocks based on the numerical quantity of the one or more transport blocks, where encoding the downlink control information may be based on the frequency hopping configuration.

Some examples of the method, apparatuses, and non-transitory computer-readable medium described herein may further include operations, features, means, or instructions for omitting an indicator of a frequency hopping configuration from the downlink control information based at least in part on the numerical quantity, where encoding the downlink control information is based at least in part on omitting the indicator of the frequency hopping configuration from the downlink control information.

Some examples of the method, apparatuses, and non-transitory computer-readable medium described herein may further include operations, features, means, or instructions for identifying a second numerical quantity of bits of the downlink control information for indicating a modulation and coding scheme of the one or more transport blocks based on the numerical quantity of the one or more transport blocks associated with the downlink control information, where encoding the downlink control information may be based on identifying the second numerical quantity of bits of the downlink control information for indicating the modulation and coding scheme.

Some examples of the method, apparatuses, and non-transitory computer-readable medium described herein may further include operations, features, means, or instructions for identifying a range of possible modulation and scheme configurations associated with the one or more transport blocks, where identifying the second numerical quantity of bits may be based on identifying the range of possible modulation and coding scheme configurations.

Some examples of the method, apparatuses, and non-transitory computer-readable medium described herein may further include operations, features, means, or instructions for assigning a unique combinatorial number to each possible combination of hybrid automatic repeat request processes with the numerical quantity of the one or more transport blocks associated with the downlink control information, where the downlink control information includes the unique combinatorial number.

In some examples of the method, apparatuses, and non-transitory computer-readable medium described herein, at least one field of the downlink control information block may be jointly encoded according to the encoding scheme to include values for at least two parameters, where each possible output of the encoding scheme corresponds to a jointly valid combination of the at least two parameters.

Some examples of the method, apparatuses, and non-transitory computer-readable medium described herein may further include operations, features, means, or instructions for encoding, jointly according to the encoding scheme, a field of the downlink control information block to identify a first parameter indicating a hybrid automatic repeat request configuration and a second parameter indicating a new data indicator, where encoding the downlink control information block may be based on encoding the field.

Some examples of the method, apparatuses, and non-transitory computer-readable medium described herein may further include operations, features, means, or instructions for encoding, jointly according to the encoding scheme, a field of the downlink control information block to identify a first parameter indicating a modulation and coding scheme configuration and a second parameter indicating a repetition number, where encoding the downlink control information block may be based on encoding the field.

Some examples of the method, apparatuses, and non-transitory computer-readable medium described herein may further include operations, features, means, or instructions for determining a combinatorial index mapping for the at least two parameters of the one or more transport blocks, where the at least one field of the downlink control information block that may be jointly encoded includes the combinatorial index mapping.

Some examples of the method, apparatuses, and non-transitory computer-readable medium described herein may further include operations, features, means, or instructions for applying a first parameter and a second parameter to a combinatorial algorithm to determine a combinatorial index mapping for the at least one field of the downlink control information block that may be jointly encoded.

DETAILED DESCRIPTION

Downlink control information (DCI) may be used to schedule one or more transport blocks. As the number of transport blocks scheduled by a DCI increases, so can the size of the DCI. Encoding/decoding techniques may be implemented to limit the size of the DCI even as the number of transport blocks scheduled by the DCI increases.

Techniques are described herein for encoding DCI based on the number of transport blocks being scheduled by the DCI. For example, if the DCI supports one or two transport blocks, a first encoding scheme may be used to encode/decode the DCI. If the DCI supports three or more transport blocks, a second encoding scheme may be used to encode/decode the DCI. In some examples, the number of transport blocks may be indicated explicitly using a dedicated field included in the DCI. In other examples, the number of transport blocks can be implicitly signaled in the bitstream of the DCI block.

The type of encoding scheme may be based on the coverage enhancement (CE) mode associated with the UE. For example, if the UE is in CE Mode A, a first set of encoding schemes may be available to encode/decode the DCI based on the different numbers of transport blocks. If the UE is in CE Mode B, a second set of encoding schemes may be available to encode/decode the DCI based on the different numbers of transport blocks.

Aspects of the disclosure are initially described in the context of wireless communications systems. Aspects of the disclosure are described with reference to a process flow. Aspects of the disclosure are further illustrated by and described with reference to apparatus diagrams, system diagrams, and flowcharts that relate to downlink control information for scheduling one or more transport blocks.

Figure 1:
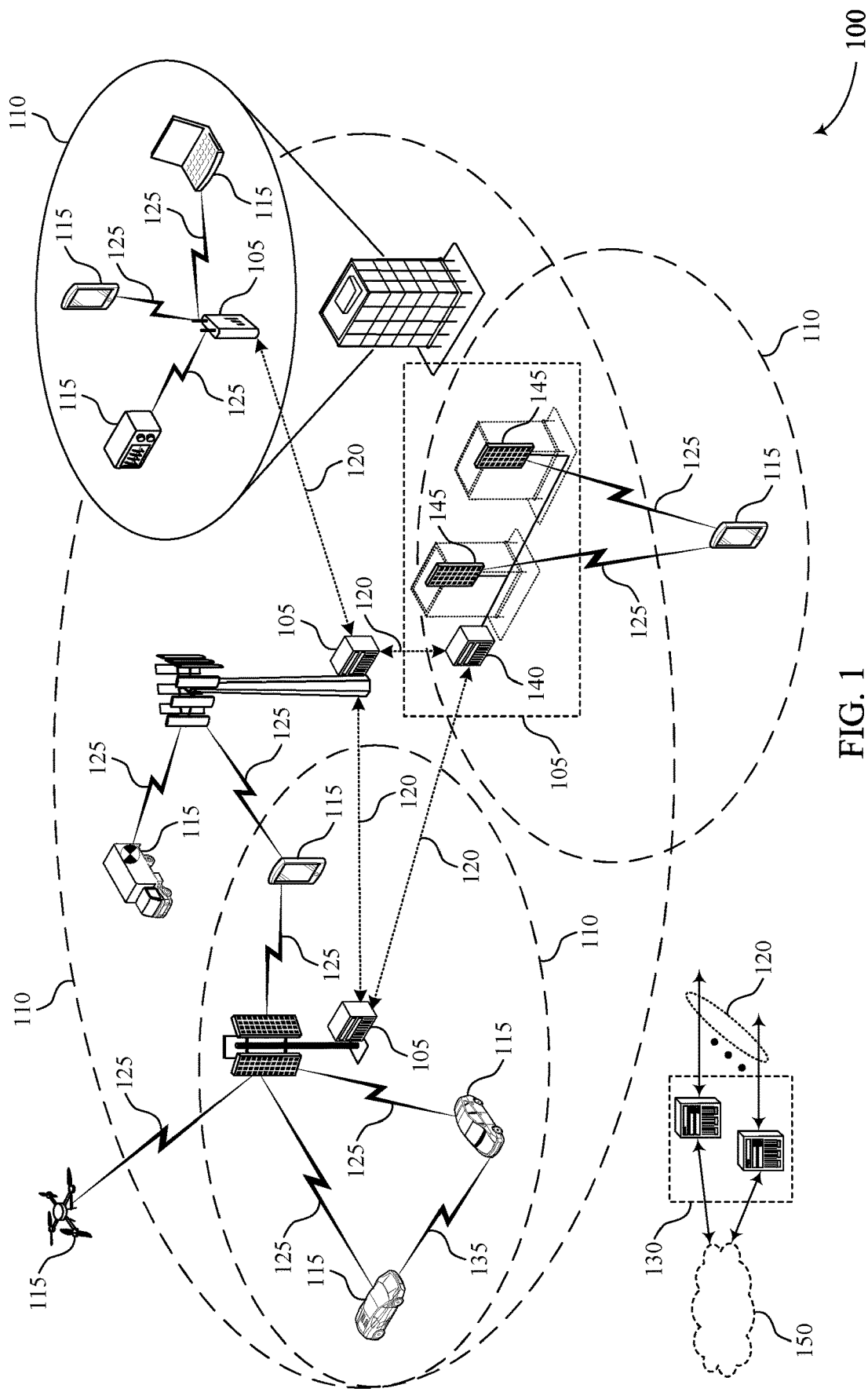
FIG. 1 illustrates an example of a system for wireless communications that supports downlink control information for scheduling one or more transport blocks in accordance with aspects of the present disclosure.

FIG. 1 illustrates an example of a wireless communications system 100 that supports downlink control information for scheduling one or more transport blocks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

Techniques are described herein for encoding DCI based on the number of transport blocks being scheduled by the DCI. The number of transport blocks supported by the DCI may be indicated explicitly using a field included in the DCI. The number of transport blocks can be implicitly signaled in a bitstream of the DCI block. The type of encoding scheme may be based on the CE mode associated with the UE.

As such, wireless communications system 100 may more efficiently communicate parameters for one or more transport blocks scheduled by a DCI. Such features may improve signaling efficiency by reducing an amount of control information communicated relative to data being communicated. In some examples, reducing the size of DCI transmitted may improve the coverage area that can effectively receive the DCI. In some examples, reducing the size of DCI transmitted may reduce the power consumption of the UE 115 when transmitting the DCI. By compressing the DCI and using the DCI to schedule one or more transport blocks, the user experience with the UE 115 may improve by improving the battery life, improving data throughput, and decreasing a likelihood that data is lost.

Figure 2:
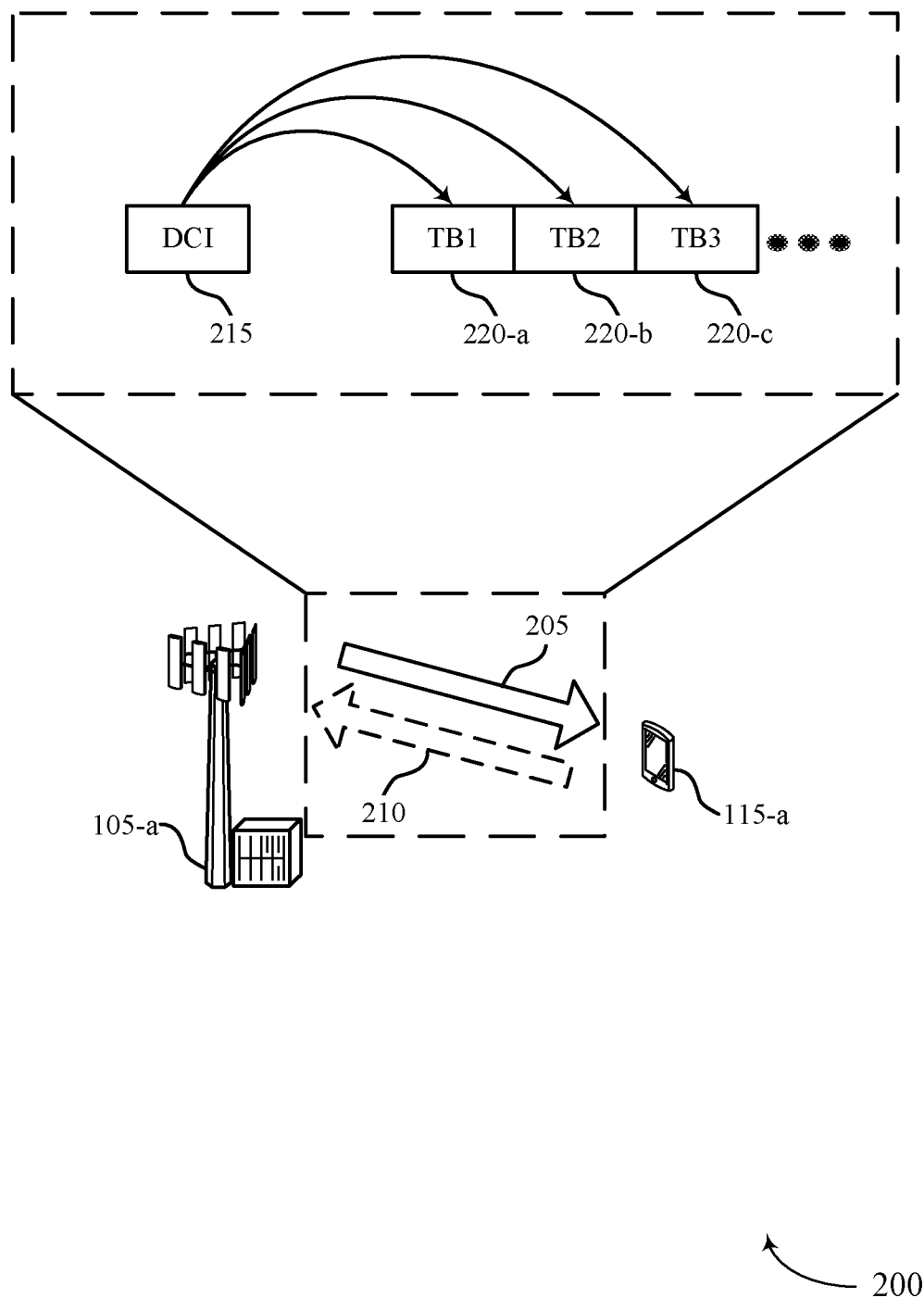
FIG. 2 illustrates an example of a wireless communications system that supports downlink control information for scheduling one or more transport blocks in accordance with aspects of the present disclosure.

FIG. 2 illustrates an example of a wireless communications system 200 that supports downlink control information for scheduling one or more transport blocks in accordance with aspects of the present disclosure. In some examples, the wireless communications system 200 may implement aspects of wireless communication system 100. Wireless communications system 200 may include UE 115-*a* and base station 105-*a*, which may be examples of a UE 115 and a base station 105 described with reference to FIG. 1.

Base station 105-*a* and UE 115-*a* may communicate using a downlink link 205 and an uplink link 210. Base station 105-*a* may transmit DCI to UE 115-*a* on the downlink link 205 to schedule transmissions. For example, the DCI may schedule resources for base station 105-*a* to transmit a transport block 220 on the downlink link 205 to UE 115-*a* for downlink communications. Or, the DCI may schedule UE 115-*a* to transmit a transport block 220 on the uplink link 210 to base station 105-*a* for uplink communications. In some cases, the transport block 220 may carry uplink or downlink data and be transmitted on an uplink data channel (e.g., a physical uplink shared channel (PUSCH)) or a downlink data channel (e.g., a physical downlink shared channel (PDSCH)) scheduled by the DCI.

In some wireless communications systems, a single DCI transmission may schedule a single transport block. Thus, if the UE 115 has multiple pending transport blocks to transmit or receive, the base station 105 may transmit a DCI for each of the pending transport blocks. This may result in high power consumption for the UE 115, as the UE 115 may monitor for each of the DCI individually and decode them in order to receive the scheduling for the transport blocks.

In some wireless communication systems, the base station 105-*a* may instead transmit a DCI block 215 to schedule one or more transport blocks 220. In such cases, a DCI block 215 may be configurable to support any number of transport blocks 220 (e.g., one, two, three, four, five, six, seven, eight, etc.). The DCI block 215 may include control information for each of the one or more transport blocks 220. For example, the DCI block 215 may schedule a first transport block 220-*a* (TB1), a second transport block 220-*b* (TB2), and a third transport block 220-*c* (TB3) as well as other transport blocks 220 not shown. In some cases, the DCI block 215 may schedule fewer transport blocks 220 than what is shown. The DCI block 215 may schedule between 1 and N transport blocks 220, where N may be an integer such as one, two, three, four, five, six, seven, eight, etc. In some cases, N transport blocks 220 may be 2, 4, 8, and so on (e.g., where N is a power of 2, or $2^n$). The value of N may be configurable and may be based on, for example, a type of communications between base station 105-*a* and UE 115-*a*. For example, N may be based on whether the communications are machine type communications (MTC) or a coverage enhancement mode for MTC, whether the communications are IoT (e.g., narrowband (NB) IOT), etc. Techniques described herein may be applied for encoding DCI based on a numerical quantity of transport blocks supported by the DCI.

As the numerical quantity of transport blocks supported by a single DCI increases, the size of the DCI to communicate parameters about each transport block may increase. Parameter about transport blocks that are communicated by DCI may include HARQ process configurations, new data indicators (NDIs), modulation and coding scheme (MCS) configurations, repetition number configurations, redundancy version configurations, frequency hopping indications, or combinations thereof. As the size of the DCI increases, it may hinder the coverage or coverages area of the physical downlink control channel (PDCCH).

In some examples, the DCI may be compressed by jointly encoding parameters into a single field. The DCI may be encoded to form a DCI block. The DCI block may be a compressed form of the underlying DCI. The terms DCI and DCI block may be used interchangeable throughout this disclosure. To ensure greater compression, the encoding scheme may omit invalid combinations of the parameter configurations to ensure that every value of the jointly encoded field indicates a valid combination of parameter configurations. For example, if HARQ processes and NDI are jointly encoded in a single field of the DCI block, and a HARQ process is not scheduled, an NDI also does not need to be scheduled. Thus, a combination that does not schedule a HARQ process for a transport block and schedules an NDI for that same transport block may be an invalid combination that the encoding scheme is configured to omit.

Other examples of encoding schemes that jointly encode two or more parameters into a single field of the DCI block are described herein. In some examples, some parameters (such as MCS, Frequency Hopping Indicator, number of repetitions of PDSCH/PUSCH) may be common across all N transport blocks that may be scheduled by the DCI. In some examples, the HARQ processes scheduled, corresponding NDIs, and potentially, corresponding redundancy version indices, may be jointly encoded into a single field to eliminate signaling redundant combinations across these parameters. In some examples, the MCS and repetition number may be jointly encoded to save the total number of combinations needed to be signaled. This may occur because when the number of repetitions configured for PDSCH/PUSCH is large, the coverage is most likely poor, resulting in some MCS configurations (e.g., large MCS values) being of limited usefulness.

In some examples, the number of repetitions of PDSCH/PUSCH and the frequency hopping (FH) indicator (when it exists, for example, in the DCI format for CE Mode A in eMTC) may be jointly encoded to limit the size of the resulting DCI block that is communicated to the UE 115-*a*. Such a situation may occur because when (in CE Mode A) the number of repetitions for PDSCH/PUSCH is one (1), the FH indicator may be redundant. As a result, the number of valid combinations of the number of repetitions and the frequency hopping indicator may be less than a total number of possible combinations for CE Mode A.

An upper limit of the numerical quantity of transport blocks that can be scheduled by a DCI may depend on the CE Mode of the communications with the UE. For example, if the CE Mode A is employed, the upper limit of the number of transport blocks that can be scheduled by a DCI may be eight (8). In another example, if the CE Mode B is employed, the upper limit of the number of transport blocks that can be scheduled by a DCI may be four (4).

In some wireless communication systems, the size of the DCI block may be independent from the numerical quantity of transport blocks scheduled by the DCI block. For example, the DCI block may be a first size whether one transport block is scheduled or whether eight transport blocks are scheduled. In such wireless communication systems, the information communicated in DCI for higher numerical quantities of transport blocks may be compressed to fit more information into the DCI block.

Techniques are described herein for using different encoding schemes to encode DCI based on the numerical quantity of transport blocks being scheduled by the DCI. For example, if fewer transport blocks are being scheduled by the DCI (e.g., one or two transport blocks), the DCI block may be encoded with a first encoding scheme that provides full scheduling flexibility. If more transport blocks are being scheduled by the DCI (e.g., three or more transport blocks), the DCI block may be encoded with a second encoding scheme different than the first encoding scheme that provides reduced scheduling flexibility. The reduced scheduling flexibility may occur certain parameters may be jointly encoded into a single field. For example, in the second encoding scheme, the MCS and the repetition number may be jointly encoded, where in the first encoding scheme those parameters are communicated in their own fields. Thus, the encoding scheme and the resultant interpretation of the fields of the DCI block may be based on the number of transport blocks scheduled by the DCI block.

The encoding scheme selected to encode the DCI may selected based a range of transport blocks being supported. If DCI can support up to N transport blocks, the set of transport blocks $\{1:N\}$ may be partitioned into L sets, where $S_1=\{1:P_1\}$, $S_2=\{(P_1+1):P_2\}$, ..., $S_L=\{(P_{L-1}+1):N\}$. A simple example of such a partition is two sets that include a first set of one and two transport blocks being supported (e.g., $\{1, 2\}$) and a second set of three or more transport blocks being supported (e.g., $\{3, N\}$). Any number of sets and divisions of sets may be supported. Each set of transport blocks may be associated with a unique encoding scheme. Thus, a base station 105-*a* may identify the number of transport blocks to be scheduled by a DCI and then identify an encoding scheme for encoding the DCI into a DCI block based on the set divisions described herein. Upon receiving the DCI block, the UE 115-*b* may identify the number of transport blocks scheduled by the DCI block or the encoding scheme used to encode the DCI block based on the information in the DCI block and then apply a corresponding decoder. Partitioned sets of transport blocks may include any number of transport blocks, including one, two, three, four, five, six, seven, or eight transport blocks.

The DCI block may be configured to include an explicit indication of the numerical quantity of transport blocks scheduled by the DCI. For instance, the DCI block may include a field configured to indicate the number of transport blocks scheduled. In cases where the numbers of transport blocks are partitioned into sets, the field may be configured to indicate which set of transport blocks are supported. In yet other cases, the field may be configured to indicate which encoding scheme was used to encode the transport block. When a one-to-one mapping exists between sets of transport blocks and encoding schemes, indicating the set transport blocks is synonymous with indicating the encoding scheme. In a specific example, if there are two sets of transport blocks (e.g., $S_1=\{1,2\}$ $S_2=\{3, \ldots, N\}$) that are each mapped to a unique encoding scheme (e.g., $S_1$ is mapped to a first encoding scheme and $S_2$ is mapped to a second encoding scheme), the DCI block may include a 1-bit field to indicate which set or which encoding scheme is used. The field for explicitly indicating the number of transport blocks scheduled by the DCI block, the set of transport blocks scheduled by the DCI block, or the encoding scheme used to encode the DCI block may be any number of bits (e.g., one, two, three, four, five, six, etc.)

The DCI block may be configured to implicitly indicate the numerical quantity of transport blocks scheduled by the DCI block. In such examples, the UE 115-$a$ may be configured to identify the numerical quantity of based on the values of one or more other fields of the DCI block. In some cases, it may be based on fields that jointly encode two or more parameters. For example, a field used to indicate a configuration of a parameter (e.g., such as MCS or repetition number) may be jointly encoded with an indication of the numerical quantity of transport blocks supported by the DCI block. In some examples, a field used to indicate jointly encoded parameters may be further configured to indicate three or more parameters, including the numerical quantity of transport blocks supported by the DCI block. In another example, the UE 115-$a$ may expect values within 0-31 for first section of bits of the DCI block (e.g., a bitstream $a_2 \ldots a_6$ of the DCI block). If the value represented by the first section is between 0-7, the UE 115-$a$ may determine that one transport block is being scheduled by the DCI, while if the value represented by the first section is between rom 8-31, the UE 115-$a$ may determine that two transport blocks are scheduled. So, the UE 115-$a$ may read the bitstream, and based on criterion, know which encoding/decoding algorithm to apply. In some cases, every event scheduled by the DCI corresponds to a unique number/bitstream.

In some cases, the UE 115-$a$ may determine the numerical quantity of transport blocks scheduled by the DCI block from an indicator that is not explicitly listing the numerical quantity. For example, the UE 115-$a$ may determine the numerical quantity of transport blocks from an indicator of a set of transport blocks (e.g., $S_1=\{1,2\}$) scheduled by the DCI block or from an indicator of the encoding scheme used to encode the DCI block or other types of indicators.

Some parameters indicated by fields in the DCI block may be encoded/decoded differently based on the numerical quantity of transport blocks being scheduled by the DCI. Examples of parameters that may be encoded/decoded differently based on the numerical quantity of the transport blocks include a redundancy version for the transport blocks, a frequency hopping indication, an MCS configuration, or a combination thereof.

In some instances, one or more redundancy versions for the transport blocks may be encoded/decoded differently in the DCI block based on the numerical quantity of the transport blocks. For example, when a certain number of transport blocks (e.g., one transport block or two transport blocks) is scheduled, the redundancy version for those one or more transport blocks may be signaled in the DCI; while for other numbers of transport blocks (e.g., three or more transport blocks) scheduled, the DCI may signal a common redundancy version field for all the transport blocks scheduled or, alternatively, not signal a redundancy version for the transport blocks scheduled by the DCI. When a redundancy version is not indicated by DCI, the UE 115-$a$ may determine that the redundancy version is a default redundancy version for the one or more transport blocks or a default set of redundancy versions for the one or more transport blocks. In some instances, the redundancy version for the one or more transport blocks may be omitted from the DCI. Such an omission may be based on the numerical of transport blocks scheduled by the DCI. In such instances, the UE 115-$a$ may determine whether a redundancy version is enabled or may determine a redundancy version configuration based on an RRC configuration of the UE 115-$a$. These instances of indicating the one or more redundancy versions may be employed in any coverage enhancement mode (e.g., CE Mode A or CE Mode B).

In some instances, the frequency hopping indicator for the transport blocks may be encoded/decoded differently in the DCI block based on the numerical quantity of the transport blocks. For example, when a certain number of transport blocks (e.g., one transport block or two transport blocks) is scheduled, the DCI may include a field that indicates frequency hopping parameter; while for other numbers of transport blocks (e.g., three or more transport blocks) scheduled, the DCI may not include the field that indicates the frequency hopping parameter. In instances where the field for frequency hopping is not included in the DCI, the frequency hopping configuration may be based on information included in the system information block (SIB). These instances of indicating the frequency hopping parameter may be employed in any coverage enhancement mode (e.g., CE Mode A or CE Mode B).

In some instances, the frequency hopping indicator for the one or more transport blocks may be omitted from the DCI. Such an omission may be based on the numerical of transport blocks scheduled by the DCI. In such instances, the UE 115-$a$ may determine whether frequency hopping is enabled or may determine a frequency hopping configuration based on an RRC configuration of the UE 115-$a$.

In some instances, one or more MCS configurations for the transport blocks may be encoded/decoded differently in the DCI block based on the numerical quantity of the transport blocks. For example, when a certain number of transport blocks (e.g., one transport block or two transport blocks) is scheduled, full MCS scheduling flexibility may be utilized afforded; while for other numbers of transport blocks (e.g., three or more transport blocks) scheduled, the numerical quantity of possible MCS configurations that may be indicated by the DCI may be restricted. In some instances (described in more detail herein), the numerical quantity of possible MCS configuration that may be indicated by the DCI may be based on the number of the bits in the field that indicates the number of repetitions. In such cases, the MCS configurations indicated by the MCS field of the DCI may use a distinct interpretation of the MCS tables used in legacy DCI. For example, the MCS values indicated in the DCI may point to the lowest MCS values in the MCS tables or may point to some subset of the MCS values in the MCS tables. These instances of indicating the one or more MCS configurations may be employed in any coverage enhancement mode (e.g., CE Mode A or CE Mode B).

Some parameters may be encoded in the DCI block the same way, regardless of how many transport blocks are scheduled by the DCI. For example, the HARQ process identifiers scheduled by the DCI and the corresponding NDIs may be jointly encoded in the same field of the DCI block in every encoding scheme, irrespective of the numerical quantity of transport blocks scheduled by the DCI block.

In some instances, one or more HARQ processes for the transport blocks may be encoded/decoded differently in the DCI block based on the numerical quantity of the transport blocks. When signaling how many HARQ processes or which HARQ processes are used or both, the encoding scheme may be based upon assigning a unique combinatorial number $r_k$ to each possible combination of HARQ processes with k transport blocks (out of a possible N transport blocks) scheduled, such that the UE 115-$a$ can determine the exact k-combination from $r_k$. Additional or alternatively, uniquely identifiable combinatorial numbers corresponding to the HARQ processes scheduled may be used as part of the encoding process. The uniquely identifiable combinatorial numbers may correspond to the NDIs of the HARQ processes scheduled, the redundancy version indices (when signaled) of the HARQ processes scheduled, or combinations thereof. One or more uniquely identifiable combinatorial numbers corresponding to the jointly-encoded identities of the HARQ processes scheduled, the NDIs, the redundancy version indices (when signaled), or combinations thereof may be employed in the DCI encoding. These instances of indicating the one or more HARQ processes may be employed in any coverage enhancement mode (e.g., CE Mode A or CE Mode B).

A first detailed example of a DCI encoding/decoding scheme to support one or more transport blocks scheduled by the DCI is described. This first detailed example may be implemented in any CE mode or may be modified based on any of the techniques and options described herein. Specific values should not be considered limiting to this disclosure.

The DCI block may be first number of bits that is fixed, irrespective of how many transport blocks are scheduled by the DCI. In this specific example, the DCI block may be 13-bits. The DCI block may include the following a fields: a first field to indicate the encoding scheme used to encode the DCI block (or the number of transport blocks supported), a second field that is jointly encoded to indicate the HARQ process and the NDI, a third field to indicate MCS configurations, a fourth filed to indicate repetition numbers, or a combination thereof. In some cases, the third field may be jointly encoded to indicate the MCS configurations and the repetitions numbers and no fourth field may be included.

The base station 105-$a$ may identify a number of transport blocks scheduled by the DCI. In some cases, the base station 105-$a$ may identify a set of transport blocks based on the number of transport blocks. In some cases, the base station 105-$a$ may identify an encoding scheme for the DCI based on the identified number of transport blocks, the identified set of transport blocks, or both. For example, if there are two possible encoding schemes, the base station 105-$a$ may determine whether the DCI is encoded into a DCI block using a first encoding scheme (e.g., associated with $S_1$={1, 2} set of transport blocks) or a second encoding scheme (e.g., associated with $S_2$={3, ..., N} set of transport blocks).

For the first encoding scheme associated with fewer transport blocks being scheduled (e.g., $S_1$={1,2}), the bit values ($a_x$) for the DCI block are described below. A first bit $a_1$ of the DCI block may indicate the encoding scheme used or the number of transport blocks scheduled. For example, the first bit may be a zero (0) if the first encoding scheme is used or may be a one (1) if the second encoding scheme is used. In other examples, additional bits may be used to indicate this value. Bits $a_2$ through $a_6$ may represent a jointly encoded value of a HARQ parameter and NDI. In some examples, these bits may represent up to 32 valid combinations of the HARQ process and NDI parameters $$\left(\text{e.g.,} \binom{4}{1}2^1 + \binom{4}{2}2^2 = 32\right),$$

when a single transport block is supported. If a different number of transport blocks are supported (e.g., two transport blocks are supported) the number of valid combinations may be different. The combinatorial index value of these bits may be determined a first encoding algorithm described in more detail below. Bits $a_7$ through $a_{10}$ may indicate one or more MCS configurations for the one or more transport blocks. Bits $a_{11}$ through $a_{13}$ may indicate one or more repetition numbers for the one or more transport blocks.

For the second encoding scheme associated with more transport blocks being scheduled (e.g., $S_2$={3, N}), the bit values ($a_x$) for the DCI block are described below. A first bit $a_1$ of the DCI block may indicate the encoding scheme used or the number of transport blocks scheduled. In this specific example, the first bit may be a one (1) indicating that the second encoding scheme is used. Bits $a_2$ through $a_7$ may represent a jointly encoded value of a HARQ parameter and NDI. In some examples, these bits may represent up to 48 valid combinations of the HARQ process and NDI parameters $$\left(\text{e.g.,} \binom{4}{3}2^3 + \binom{4}{4}2^4 = 48\right),$$

when a three transport blocks are supported. If a different number of transport blocks are supported (e.g., four transport blocks) the number of valid combinations may be different. The combinatorial index value of these bits may be determined a first encoding algorithm described in more detail below. The combinatorial index value of these bits may be determined a second encoding algorithm described in more detail below. Bits $a_8$ through $a_{13}$ may represent a jointly encoded value to indicate one or more MCS configurations for the one or more transport blocks and one or more repetition numbers for the one or more transport blocks. The jointly encoded value for these bits may be determined based on the table provided below.

TABLE 1

Bits $a_8$ through $a_{13}$ for the second encoding scheme

| Repetition number | Bits representing repetition number (Prefix-free encoding) | Bits remaining to encode MCS |
|---|---|---|
| $n_1$ | $a_8 = 0$, $a_9 = 0$ | 4-bits "$a_{10}a_{11}a_{12}a_{13}$" |
| $n_2$ | $a_8 = 0$, $a_9 = 1$, $a_{10} = 0$ | 3-bits "$a_{11}a_{12}a_{13}$" |
| $n_3$ | $a_8 = 0$, $a_9 = 1$, $a_{10} = 1$ | 3-bits "$a_{11}a_{12}a_{13}$" |
| $n_4$ | $a_8 = 1$, $a_9 = 0$, $a_{10} = 0$ | 3-bits "$a_{11}a_{12}a_{13}$" |
| $n_5$ | $a_8 = 1$, $a_9 = 0$, $a_{10} = 1$ | 3-bits "$a_{11}a_{12}a_{13}$" |
| $n_6$ | $a_8 = 1$, $a_9 = 1$, $a_{10} = 0$ | 3-bits "$a_{11}a_{12}a_{13}$" |
| $n_7$ | $a_8 = 1$, $a_9 = 1$, $a_{10} = 1$, $a_{11} = 0$ | 2-bits "$a_{12}a_{13}$" |
| $n_8$ | $a_8 = 1$, $a_9 = 1$, $a_{10} = 1$, $a_{11} = 1$ | 2-bits "$a_{12}a_{13}$" |

As shown in Table 1, the number of bits in the jointly encoded value for the MCS configuration may be based on the repetition number being signaled. As such, the range of possible MCS configurations available may be based on the repetition number. For example, if a first repetition number is used, up to sixteen (16) unique MCS configurations may be encoded in the DCI block. In contrast, if a different repetition number is used, up to four (4) unique MCS configurations may be encoded. The base station 105-*a* may identify a range possible MCS configurations before encoding the DCI block. When using a reduced range of possible MCS values, the base station 105-*a* may identify a subset of the MCS tables from which the base station 105-*a* may select the encoded MCS configuration. For example, if two bits are used to indicate the MCS configuration, the subset of MCS values from which the base station 105-*a* may select may be the lowest MCSs in the MCS tables. In some examples, any subset the MCS values in the MCS tables may be defined for any granularity of MCS signaling the DCI block. In such examples, one or more mapping tables may map indices of the subset to the indices of the underlying MCS tables.

Returning now to the first encoding algorithm and the second encoding algorithm used to determine the jointly encoded value for the HARQ processes and the NDI. In both algorithms, $r_{HARQ}^{(i)}$ is the combinatorial index mapping the HARQ processes $\{H_k\}_{k=0}^{i-1}$, ($1 \leq H_k \leq 4$, $H_k < H_{k+1}$) scheduled, and is given by Equation 1.

$$r_{HARQ}^{(i)} = \sum_{k=0}^{i-1} \binom{4-H_k}{i-k}, \text{ where } \binom{x}{y} = \begin{cases} \binom{x}{y} & x > y \\ 0 & x < y \end{cases} \quad (1)$$

The term $r_{NDI}^{i}$ is a combinatorial index mapping the NDIs $\{N_k\}_{k=0}^{i-1}$, ($N_k \in \{0,1\}$) of the HARQ processes scheduled above, and is given by Equation 2.

$$r_{NDI}^{(i)} = \sum_{k=0}^{i-1} 2^k N_k \quad (2)$$

In some cases, the first encoding algorithm may be based on the specific number of transport blocks being scheduled by the DCI. If the first encoding scheme is associated with $S_1=\{1,2\}$ and the number of transport blocks being scheduled is one (1), bits $a_2$ through $a_6$ may be determined using Equation 3.

$$a_2 \ldots a_6 = dec2bin\left(r_{HARQ}^{(1)} + \binom{4}{1} r_{NDI}^{(1)}\right) \quad (3)$$

If the first encoding scheme is associated with $S_1=\{1,2\}$ and the number of transport blocks being scheduled is two (2), bits $a_2$ through $a_6$ may be determined using Equation 4.

$$a_2 \ldots a_6 = dec2bin\left(8 + r_{HARQ}^{(2)} + \binom{4}{2} r_{NDI}^{(2)}\right) \quad (4)$$

In some cases, the second encoding algorithm may be based on the specific number of transport blocks being scheduled by the DCI. If the second encoding scheme is associated with $S_2=\{3, N\}$ and the number of transport blocks being scheduled is three (3), bits $a_2$ through $a_7$ may be determined using Equation 5.

$$a_2 \ldots a_7 = dec2bin\left(r_{HARQ}^{(3)} + \binom{4}{3} r_{NDI}^{(3)}\right) \quad (5)$$

If the second encoding scheme is associated with $S_2=\{3, N\}$ and the number of transport blocks being scheduled is four (4), bits $a_2$ through $a_7$ may be determined using Equation 6.

$$a_2 \ldots a_7 = dec2bin\left(32 + r_{HARQ}^{(4)} + \binom{4}{4} r_{NDI}^{(4)}\right) \quad (6)$$

Jointly encoded values included in a DCI block may be determined using look-up tables of pre-defined values (e.g., Table 1), may be determined using combinatorial algorithms (e.g., Equations 1-6), or may be determined using a combination thereof. A jointly encoded value may be an example of a combinatorial index mapping that may be decoded by the UE 115-*a* using look-up tables, combinatorial algorithms, or a combination thereof. When using combinatorial algorithms, the base station 105-*a* and the UE 115-*a* may be configured to use algorithms rather than stored values to decode or determine the values of the parameters indicated by DCI.

Figure 3:
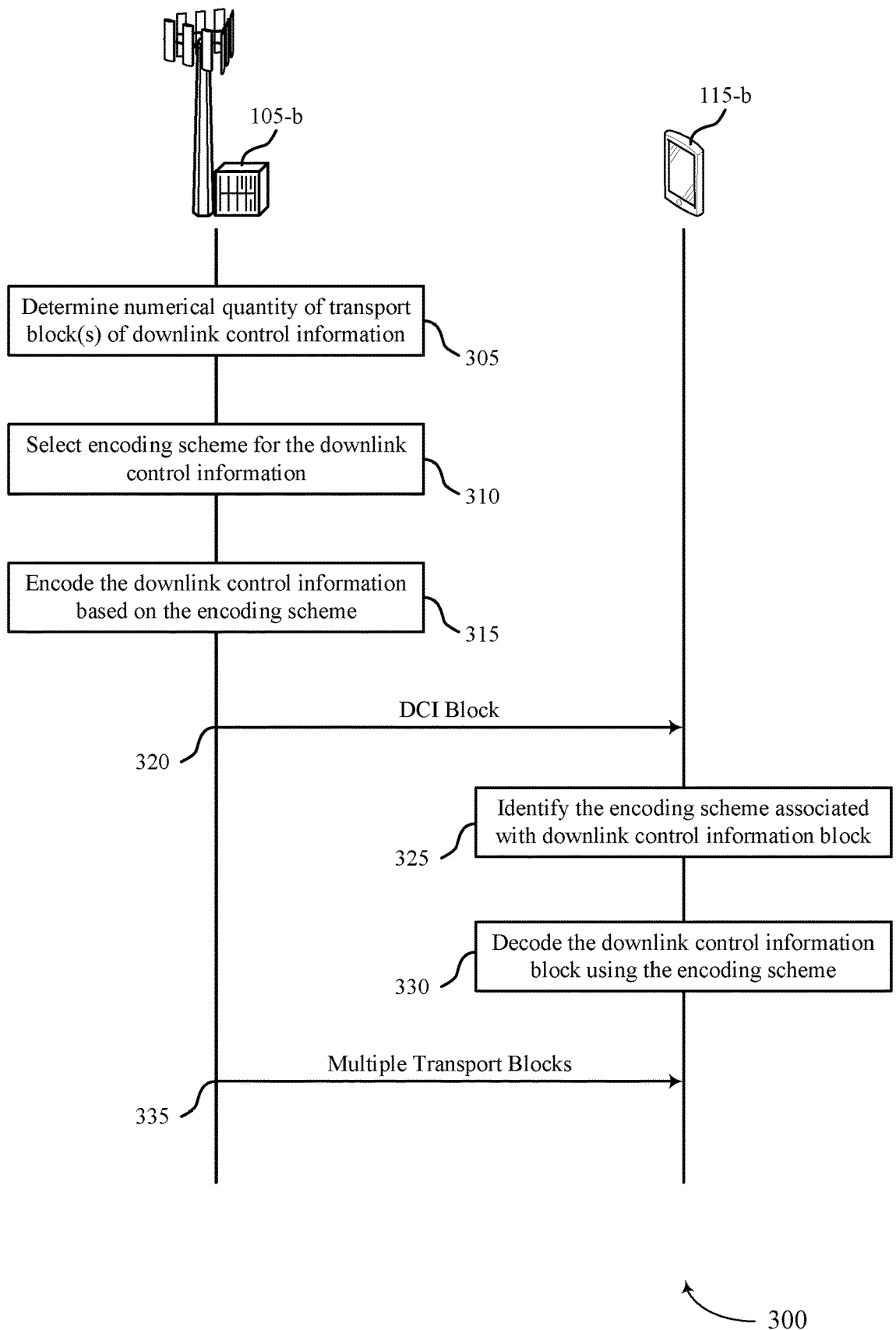
FIG. 3 illustrates an example of a process flow that supports downlink control information for scheduling one or more transport blocks in accordance with aspects of the present disclosure.

FIG. 3 illustrates an example of a process flow 300 that supports downlink control information for scheduling one or more transport blocks in accordance with aspects of the present disclosure. In some examples, the process flow 300 may implement aspects of wireless communication systems 100 or 200. Process flow 300 may include UE 115-*b* and base station 105-*b*, which may be examples of a UE 115 and a base station 105 described with reference to FIGS. 1 and 2.

When communicating DCI, the base station 105-*b* may be configured to compress the DCI into a DCI block based on the numerical quantity of transport blocks scheduled by the DCI. The process flow 300 illustrates functions and communications of the base station 105-*b* and the UE 115-*b* to both encode a DCI block and decode the DCI block based on the numerical quantity of transport blocks being scheduled by the DCI. The process flow 300 incorporates the features described with reference to FIG. 2 and any modifications of the process flow 300 based on the features described with reference to FIG. 2 are within the scope of this disclosure.

At 305, the base station 105-*b* may determine a numerical quantity of transport blocks scheduled by DCI. A DCI may be configured to support any number N of transport blocks (e.g., one, two, three, four, five, six, seven, eight, etc.). The encoding scheme used to encode a DCI block may be based on the numerical quantity of the transport blocks being scheduled by the DCI. In some cases, the encoding scheme used to encode a DCI block may also be based on a coverage enhancement mode (e.g., CE Mode A or CE Mode B). Additional details about determining the numerical quantity of transport blocks scheduled by the DCI are described with reference to FIG. 2.

At 310, the base station 105-*b* may select an encoding scheme for the downlink control information. The base station 105-*b* may use the encoding scheme to generate a downlink control information block 320 to communicate to the UE 115-*b*. Selecting the encoding scheme may be based at least in part on the numerical quantity of transport blocks scheduled by the DCI, a set of numerical values of transport blocks scheduled by the DCI, a coverage enhancement mode associated with the UE 115-*b*, or a combination thereof. In some examples, the base station 105-*b* may identify the selected encoding scheme based on a mapping between numerical quantities of transport blocks and possible encoding schemes. In some examples, the base station 105-*b* may identify a set of transport blocks based on the numerical quantity of transport blocks scheduled by the DCI and identify the selected encoding scheme based on a mapping between the possible sets of transport blocks and the possible encoding schemes. In some cases, the encoding scheme may be the encoding scheme described with reference to FIG. 4 and the processes for selecting and encoding may be accomplished using the features described with reference to FIG. 4.

The types of encoding schemes used and the mappings between the numerical values of transport blocks (or the sets of transport blocks) may be based on the coverage enhancement mode associated with the UE 115-*b*. For example, different coverage enhancement modes may use the same or different encoding schemes or may use the same or different mappings between the numerical values of transport blocks (or the sets of transport blocks) and the possible encoding schemes. Coverage enhancement modes associated with the UE 115-*b* may be established using radio resource control (RRC) signaling. When selecting the encoding scheme to use, the base station 105-*b* may identify the coverage enhancement mode associated with the UE 115-*b* and then use the encoding schemes or mappings associated with the identified coverage enhancement mode. Additional details about selecting the encoding scheme are described with reference to FIG. 2.

At 315, the base station 105-*b* may encode the downlink control information based on the encoding scheme. As a result, the base station 105-*b* may generate the downlink control information block 320. The downlink control information block 320 may represent a compressed version of the information included in the DCI. The base station 105-*b* may transmit the downlink control information block 320 to the UE 115-*b* after encoding the DCI using the encoding scheme. Additional details about encoding the downlink control information based on the encoding scheme are described with reference to FIG. 2.

The downlink control information block 320 may include explicit signaling of the numerical value of transport blocks scheduled by the DCI or may include implicit signaling of the numerical value of the transport blocks scheduled by the DCI. Additional details about the explicit signaling and the implicit signaling are described with reference to FIG. 2. In some cases, the downlink control information block 320 may include an indication of the numerical quantity of transport blocks scheduled by the DCI, a set of transport blocks scheduled by the DCI, an encoding scheme used to encode the downlink control information block 320, or a combination thereof. From any of these possible values, the UE 115-*b* may be configured to derive any of the other listed values.

At 325, the UE 115-*b* may identify the encoding scheme associated with the downlink control information block 320 based on receiving the downlink control information block 320 from the base station 105-*b*. The UE 115-*b* may identify the encoding scheme based on explicit signaling or implicit signaling in the downlink control information block. The UE 115-*b* may identify the encoding scheme using an indication of the numerical quantity of transport blocks scheduled by the DCI, a set of transport blocks scheduled by the DCI, an encoding scheme used to encode the downlink control information block 320, or a combination thereof. In some cases, when selecting the encoding scheme to use to decode the downlink control information block 320, the UE 115-*b* may identify the coverage enhancement mode associated with the UE 115-*b* and then use the encoding schemes or mappings associated with the identified coverage enhancement mode. Additional details about identifying the encoding scheme associated with the downlink control information block are described with reference to FIG. 2. In some cases, the encoding scheme may be the encoding scheme described with reference to FIG. 4 and the processes for identifying and decoding may be accomplished using the features described with reference to FIG. 4.

At 330, the UE 115-*b* may decode the downlink control information block 320 using the encoding scheme. The UE 115-*b* may decode one or more fields of the downlink control information block 320 that are jointly encoded to identify two or more parameters indicated by the DCI. Additional details about decoding the downlink control information block using the encoding scheme are described with reference to FIG. 2.

The UE 115-*b* may receive one or more transport blocks 335 from the base station 105-*b* based on the DCI communicated from the base station 105-*b* to the UE 115-*b*. The base station 105-*b* may transmit the one or more transport blocks 335 a specified duration after transmitting the downlink control information block 320.

Figure 4:
FIG. 4 illustrates an example of a encoding scheme that supports downlink control information for scheduling one or more transport blocks in accordance with aspects of the present disclosure.

FIG. 4 illustrates an example of an encoding scheme 400 that supports downlink control information for scheduling one or more transport blocks in accordance with aspects of the present disclosure. In some examples, the encoding scheme 400 may implement aspects of wireless communication systems 100 or 200.

The encoding scheme 400 may be an example of a specific encoding scheme that can be used to encode DCI into a DCI block, where the DCI can schedule one or more transport blocks. The encoding scheme 400 illustrates a DCI for scheduling up to eight (8) transport blocks. In some cases, the encoding scheme 400 may be for a DCI in CE Mode A. In other cases, the encoding scheme 400 may be for a DCI in CE Mode B. In some examples, the encoding scheme 400 may be modified for scheduling any numerical quantity of transport blocks.

The encoding scheme 400 may be used in conjunction with the features described with reference to FIGS. 2 and 3. Specifically, the features for encoding HARQ parameters, RV parameters, NDIs, or frequency hopping parameters, or combinations thereof may be used conjunction with the features of the encoding scheme 400, among other features described with reference to FIGS. 2 and 3.

In some examples, the encoding scheme 400 may be designed to comply with some constraints. Some examples of such constraints are shown in Table 2 below.

TABLE 2

Example Design Constraints for Encoding Scheme 400

| # of TBs | HARQ process constraint | RV constraint | Frequency Hopping |
|---|---|---|---|
| 1 | None | None | Indicated in DCI |
| 2 | None | {0, 2}, separate for each TB | Indicated in DCI |
| 3 | None | Fixed to 0 | Follow RRC |
| 4 | None | Fixed to 0 | Follow RRC |
| 5 | Contiguous HARQ with wrap-around | Fixed to 0 | Follow RRC |
| 6 | Contiguous HARQ with wrap-around | Fixed to 0 | Follow RRC |

TABLE 2-continued

Example Design Constraints for Encoding Scheme 400

| # of TBs | HARQ process constraint | RV constraint | Frequency Hopping |
|---|---|---|---|
| 7 | Only processes {0, . . . , 6} | Fixed to 0 | Follow RRC |
| 8 | None | Fixed to 0 | Indicated in DCI |

The encoding scheme 400 of FIG. 4 is illustrated in a table with the columns representing bits of DCI and the rows representing the DCI encoding scheme used for a specific numerical quantity of transport blocks being scheduled by the DCI. The encoding scheme 400 includes eight individual schemes 405-440 for encoding DCI being used to schedule eight different numerical quantities of transport blocks. A first scheme 405 is for scheduling one transport block in the DCI. A second scheme 410 is for scheduling two transport blocks in the DCI. A third scheme 415 is for scheduling three transport blocks in the DCI. A fourth scheme 420 is for scheduling four transport blocks in the DCI. A fifth scheme 425 is for scheduling five transport blocks in the DCI. A sixth scheme 430 is for scheduling six transport blocks in the DCI. A seventh scheme 435 is for scheduling seven transport blocks in the DCI. An eighth scheme 440 is for scheduling transport blocks in the DCI. The schemes 405-440 are illustrated in a non-numerical order to illustrate features about the indicators of the numerical quantity of transport blocks encoded in the DCI. The fields for indicators the indicators of the numerical quantity of transport blocks are shown in the white blocks of the encoding scheme 400.

How information is encoded in DCI for the encoding scheme 400 is based on the numerical quantity of transport blocks being scheduled by the DCI. The DCI may include a field that includes an indicator of the numerical quantity of transport blocks encoded in the DCI. The field for each scheme 405-440 is shown in the white blocks of each scheme 405-440.

The field or indicator may vary in size for different numerical quantities of transport blocks being scheduled. This may be based at least in part on that different numerical quantities of transport blocks use different amounts of bits to schedule the transport blocks. For example, the fields for the first scheme 405 and the seventh scheme 435 may use five bits, while the field for the second scheme 410 may use two bits and the field for the fourth scheme 420 may use a single bit. Other quantities of bits for different schemes are shown in more detail in FIG. 4. In some cases, the terms field and indicator may be used interchangeably.

The specific values in the indicators for each scheme 405-440 may be configured to make decoding the DCI easier. For example, where possible, the indicators may be examples of prefix-free encoding such that decoding can be accomplished using a logic tree. The decoding of the indicators can be done using hardware, firmware, or software, or a combination thereof. Using prefix-free encoding, a message can be transmitted as a sequence of concatenated code words, without any out-of-band markers or, alternatively markers between words to frame the words in the message. The receiver can decode the message unambiguously, by repeatedly finding and removing sequences that form valid code words. In the encoding scheme 400, the indicators of schemes 405, 415, 425, 430, 435, and 440 may be examples prefix-free encoding and the schemes 405, 415, 425, 430, 435, and 440 can be decoded unambiguously using the indicators.

In contrast, the indicators of the schemes 410 and 420 are not examples of prefix-free encoding and the decoder (e.g., a UE or other recipient of DCI) may use additional information to distinguish between the second scheme 410 and the fourth scheme 420. In the specific example of the encoding scheme, the first bit ($b_0$) of the DCI for prefix-free encoded indicators begins with a '0' logic value and the first bit ($b_0$) of the DCI for non-prefix-free encoded indicators begins with a '1' logic value. In this manner, the decoder may be configured to quickly determine whether additional processing is needed or if the decoding can be done using the prefix-free encoded indicator alone. In such cases, the decoder may identify that the value of the field includes a non-prefix-free encoded value based on the first bit ($b_0$) of the DCI.

To resolve the potential ambiguity or conflict between the second scheme 410 and the fourth scheme 420, additional bits of the DCI may be used to distinguish the schemes 410 and 420 from each other. The decoder may identify a value of one or more bits outside the field that includes the indicator. In some examples, the decoder may evaluate the second bit ($b_1$) of the DCI. If the second bit ($b_1$) of the DCI is a '0' logic value, then the DCI unambiguously is for the fourth scheme 420. The second bit ($b_1$) of the DCI for the fourth scheme 420, however, is used to encode one or more HARQ identifiers. Thus, there are situations where the second bit ($b_1$) of the DCI can be a '1' logic value. In such cases, decoder may need to examine other bits of the DCI to distinguish the schemes 410 and 420 from each other.

In some cases, the decoder may evaluate any other bits of the of DCI to distinguish between the second scheme 410 and the fourth scheme 420. In some examples, the decoder may evaluate the third bit ($b_2$) through the seventh bit ($b_6$) of the DCI to distinguish between the second scheme 410 and the fourth scheme 420. These bits may be used to encode one or more HARQ identifiers. These bits may be encoded in a way that they unambiguous distinguish between the second scheme 410 and the fourth scheme 420. For the fourth scheme 420, these bits may be used to indicate whether one of seventy (70) different HARQ processes are used. For HARQ processes 1-64, the second bit ($b_1$) of the DCI will be a '0' logic value, and, consequently, the decoder may not evaluate these bits. For HARQ processes 65-70, however, the second bit ($b_1$) of the DCI will be a '1' logic value. In such cases, bits $b_2,b_3,b_4=\{0, 0, 0\}$ in the fourth scheme 420 and bits $b_5,b_6$ can either be $\{0,0\}$, $\{0,1\}$, or $\{1,0\}$. To avoid the collisions between these bits of the second scheme 410 and the fourth scheme 420, the encoder (e.g., the base station or another transmitter of DCI) may shift the value of the HARQ index in bits $b_2,b_3,b_4,b_5,b_6$ of the second scheme 410 by some shift value. In the specific example, the encoder may use the shift value of three (3). Combinatorial HARQ index, $r_{HARQ}^i$, for both the second scheme 410 and the fourth scheme 420 (or any scheme for that matter) may be determined using Equation 7 below. The $r_{HARQ}^i$ is the combinatorial index mapping the HARQ processes $\{H_k\}_{k=0}^{i-1}$, ($1 \leq H_k \leq 8$, $H_k < H_{k+1}$) scheduled, and is given by Equation 7.

$$r_{HARQ}^i = \sum_{k=0}^{i=1} \binom{8-H_k}{i-k}, \text{ where } \binom{x}{y} = \begin{cases} \binom{x}{y} & x > y \\ 0 & x < y \end{cases} \quad (7)$$

Figure 5:
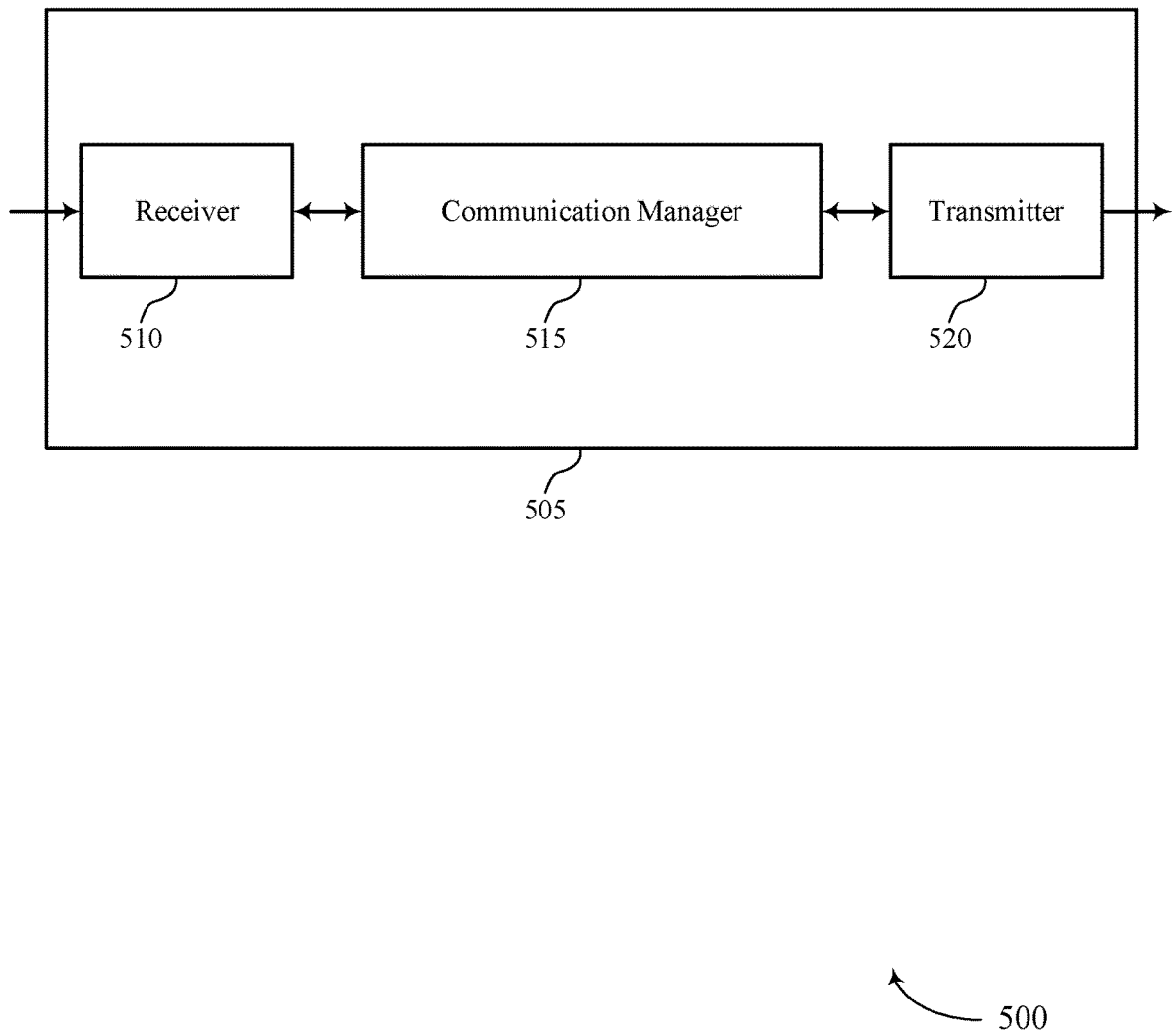
FIGS. 5 and 6 show diagrams of devices that support downlink control information for scheduling one or more transport blocks in accordance with aspects of the present disclosure.

FIG. 5 shows a diagram 500 of a device 505 that supports downlink control information for scheduling one or more transport blocks in accordance with aspects of the present disclosure. The device 505 may be an example of aspects of a UE 115 as described herein. The device 505 may include a receiver 510, a communication manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to downlink control information for scheduling one or more transport blocks, etc.). Information may be passed on to other components of the device 505. The receiver 510 may be an example of aspects of the transceiver 815 described with reference to FIG. 8. The receiver 510 may utilize a single antenna or a set of antennas.

The communication manager 515 may be configured to decode downlink control information based on a numerical quantity of transport blocks scheduled by the downlink control information. The communication manager 515 may be an example of aspects of the communication manager 810 described herein.

The communication manager 515, or its sub-components, may be implemented in hardware, code (e.g., software or firmware) executed by a processor, or any combination thereof. If implemented in code executed by a processor, the functions of the communication manager 515, or its sub-components may be executed by a general-purpose processor, a digital signal processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The communication manager 515, or its sub-components, may be physically located at various positions, including being distributed such that portions of functions are implemented at different physical locations by one or more physical components. In some examples, the communication manager 515, or its sub-components, may be a separate and distinct component in accordance with various aspects of the present disclosure. In some examples, the communication manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 815 described with reference to FIG. 8. The transmitter 520 may utilize a single antenna or a set of antennas.

Figure 6:
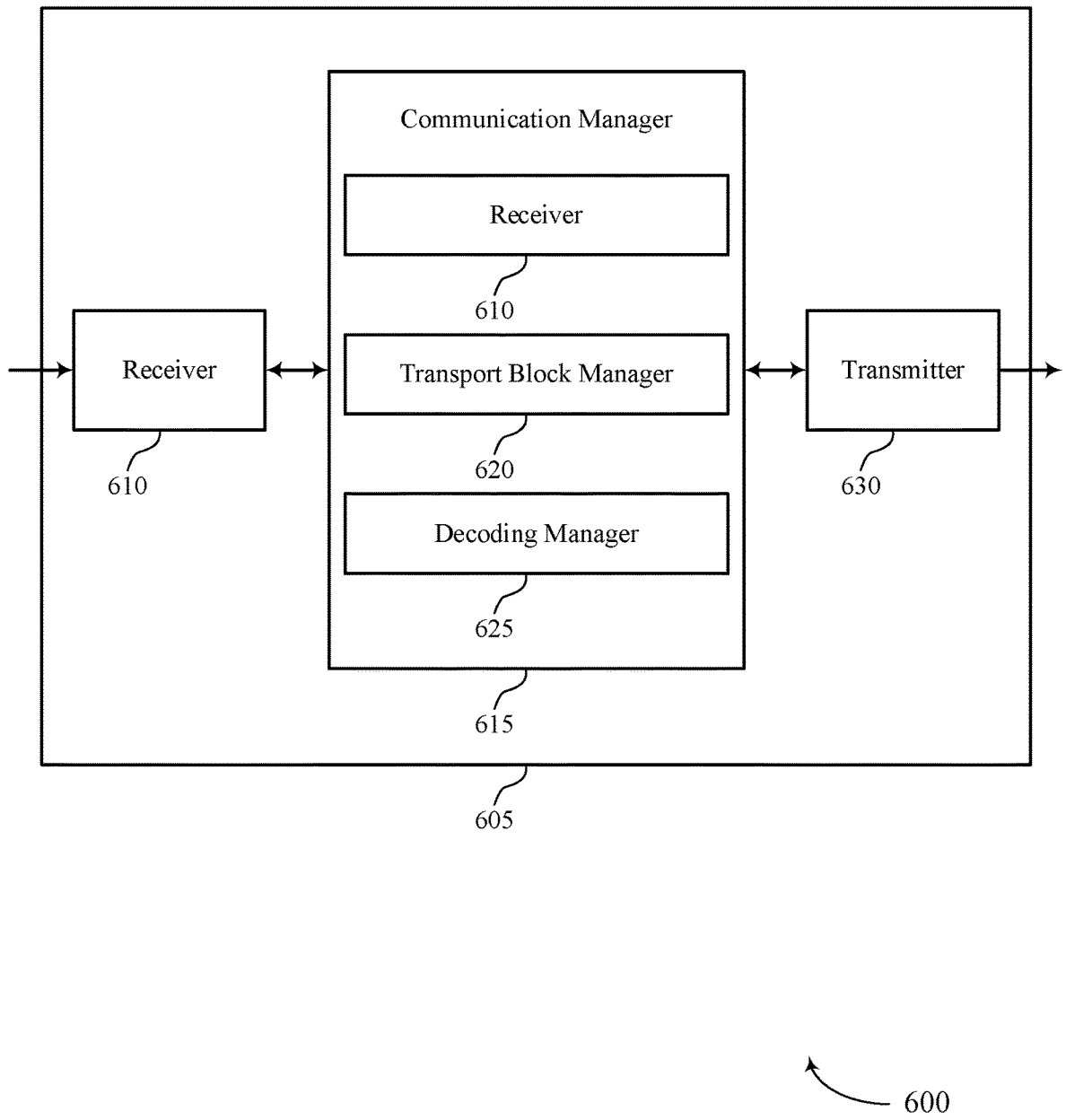

FIG. 6 shows a diagram 600 of a device 605 that supports downlink control information for scheduling one or more transport blocks in accordance with aspects of the present disclosure. The device 605 may be an example of aspects of a device 505, or a UE 115 as described herein. The device 605 may include a receiver 610, a communication manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to downlink control information for scheduling one or more transport blocks, etc.). Information may be passed on to other components of the device 605. The receiver 610 may be an example of aspects of the transceiver 815 described with reference to FIG. 8. The receiver 610 may utilize a single antenna or a set of antennas.

The communication manager 615 may be an example of aspects of the communication manager 515 as described herein. The communication manager 615 may include a receiver 610, a transport block manager 620, and a decoding manager 625. The communication manager 615 may be an example of aspects of the communication manager 810 described herein.

The receiver 610 may receive a downlink control information block including downlink control information for one or more transport blocks scheduled for the UE and receive the one or more transport blocks from a base station based on the downlink control information.

The transport block manager 620 may identify an encoding scheme used to encode the downlink control information block based on a bitstream of the downlink control information block, where the encoding scheme is associated with a numerical quantity of the one or more transport blocks.

The decoding manager 625 may decode the downlink control information block to obtain the downlink control information for the one or more transport blocks based on the identified encoding scheme.

The transmitter 630 may transmit signals generated by other components of the device 605. In some examples, the transmitter 630 may be collocated with a receiver 610 in a transceiver module. For example, the transmitter 630 may be an example of aspects of the transceiver 815 described with reference to FIG. 8. The transmitter 630 may utilize a single antenna or a set of antennas.

Figure 7:
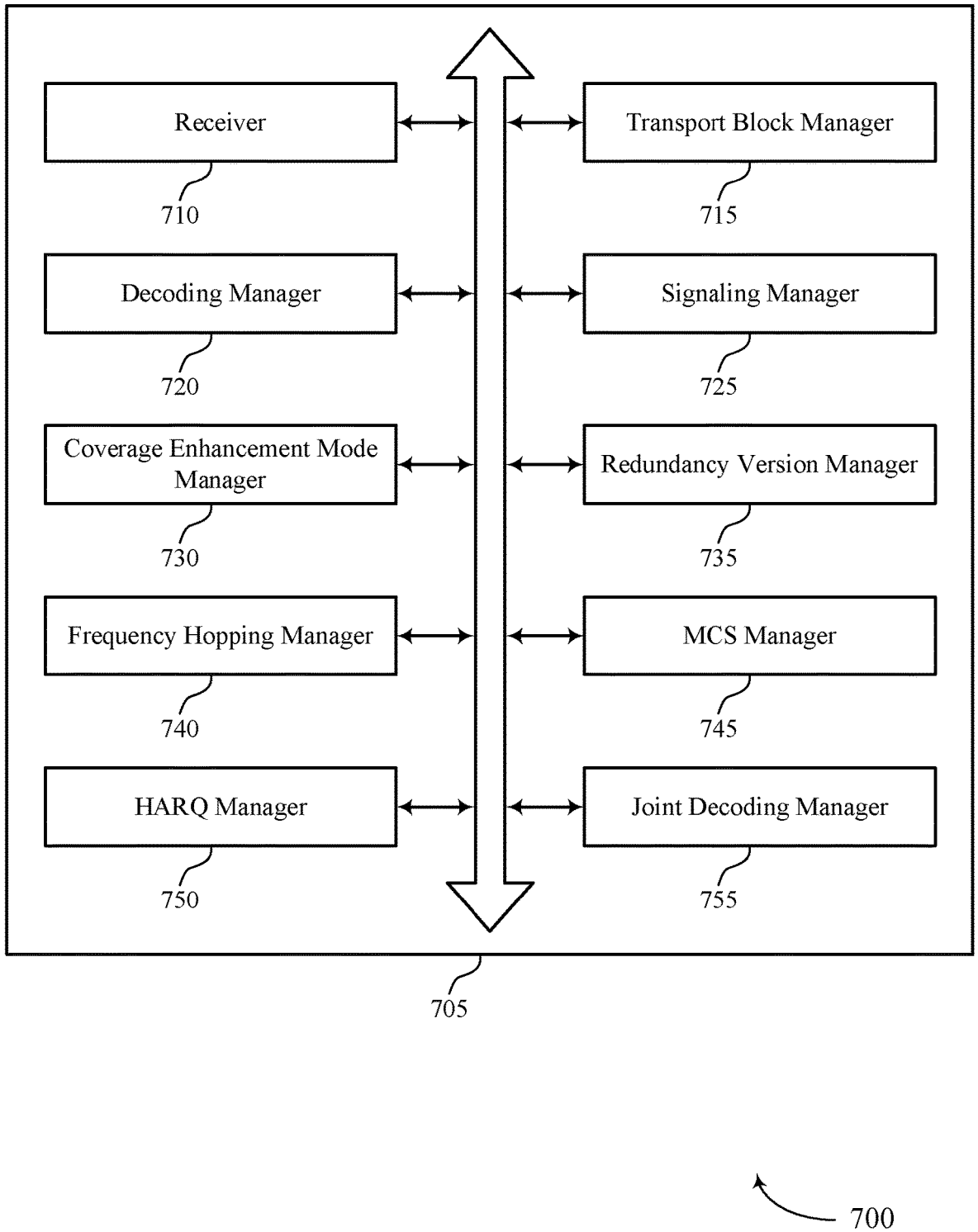
FIG. 7 shows a diagram of a communication manager that supports downlink control information for scheduling one or more transport blocks in accordance with aspects of the present disclosure.

FIG. 7 shows a diagram 700 of a communication manager 705 that supports downlink control information for scheduling one or more transport blocks in accordance with aspects of the present disclosure. The communication manager 705 may be an example of aspects of a communication manager 515, a communication manager 615, or a communication manager 810 described herein. The communication manager 705 may include a receiver 710, a transport block manager 715, a decoding manager 720, a signaling manager 725, a coverage enhancement mode manager 730, a redundancy version manager 735, a frequency hopping manager 740, a MCS manager 745, a HARQ manager 750, and a joint decoding manager 755. Each of these modules may communicate, directly or indirectly, with one another (e.g., via one or more buses).

The receiver 710 may receive a downlink control information block including downlink control information for one or more transport blocks scheduled for the UE. In some examples, the receiver 710 may receive the one or more transport blocks from a base station based on the downlink control information.

In some cases, the receiver 710 may receive information such as packets, user data, or control information associated with various information channels (e.g., control channels, data channels, and information related to downlink control information for scheduling one or more transport blocks, etc.). Information may be passed on to other components of the communication manager 705. The receiver 710 may be an example of aspects of the transceiver 715 described with reference to FIG. 7. The receiver 710 may utilize a single antenna or a set of antennas.

The transport block manager 715 may identify an encoding scheme used to encode the downlink control information block based on a bitstream of the downlink control information block, where the encoding scheme is associated with a numerical quantity of the one or more transport blocks. In some examples, the transport block manager 715 may determine the numerical quantity of the one or more transport blocks associated with the downlink control information block, where identifying the encoding scheme is based on determining the numerical quantity. In some examples, the transport block manager 715 may determine a set of transport blocks including one or more numerical quantities of transport blocks associated with the downlink control information block, where identifying the encoding scheme is based on determining the set of transport blocks.

In some examples, the transport block manager 715 may identify a value of a field of the downlink control information block that indicates the numerical quantity of the one or more transport blocks scheduled by the downlink control information, where identifying the encoding scheme is based on identifying the value of the field. In some cases, the field is different lengths for different numerical quantities of the one or more transport blocks scheduled by the downlink control information. In some cases, the field includes a prefix-free encoded value for a first portion of the numerical quantities of the one or more transport blocks scheduled by the downlink control information. In some cases, the field includes a non-prefix-free encoded value for a second portion of the numerical quantities of the one or more transport blocks scheduled by the downlink control information. In some examples, the transport block manager 715 may identify that the value of the field includes a non-prefix-free encoding value, and may identify a value of one or more bits outside of the field based on identifying that the value of the field includes the non-prefix-free encoding value, where identifying the encoding scheme is based on identifying the value of the one or more bits outside of the field. In some examples, the transport block manager 715 may identify that a first bit of the value of the field includes a first value, where identifying that the value of the field includes the non-prefix-free encoding value based on identifying that the first bit of the value of the field includes the first value. In some cases, the one or more bits are part of a field indicating a hybrid automatic repeat request configuration.

The decoding manager 720 may decode the downlink control information block to obtain the downlink control information for the one or more transport blocks based on the identified encoding scheme.

The signaling manager 725 may identify a field of the downlink control information block that indicates the encoding scheme, where identifying the encoding scheme is based on the field. In some examples, the signaling manager 725 may determine the encoding scheme or the numerical quantity implicitly from the downlink control information block for indicating one or more configurations about the one or more transport blocks, where identifying the numerical quantity is based on determining the encoding scheme from the downlink control information block.

The coverage enhancement mode manager 730 may identify a coverage enhancement mode of the UE, where decoding the downlink control information block to obtain the downlink control information is based on the coverage enhancement mode of the UE.

The redundancy version manager 735 may identify a redundancy version for the one or more transport blocks indicated in the downlink control information based on the identified encoding scheme, where receiving the one or more transport blocks is based on identifying the redundancy version. In some examples, determining that the downlink control information does not include a field to indicate the redundancy version based on the encoding scheme, where identifying the redundancy version includes identifying a default redundancy version. In some cases, the redundancy version indicated in the downlink control information includes a common redundancy version for the one or more transport blocks based on the numerical quantity.

The frequency hopping manager 740 may identify a field of the downlink control information to indicate a frequency hopping configuration for the one or more transport blocks based on the encoding scheme, where receiving the one or more transport blocks is based on the frequency hopping configuration indicated by the downlink control information. The frequency hopping manager 740 may determine that the downlink control information does not include a field to indicate a frequency hopping configuration for the one or more transport blocks based at least in part on the encoding scheme, and identify the frequency hopping configuration for the one or more transport blocks based at least in part on a radio resource configuration of the UE, where receiving the one or more transport blocks is based at least in part on identifying the redundancy version.

The MCS manager 745 may identify a second numerical quantity of bits of the downlink control information for indicating a modulation and coding scheme of the one or more transport blocks based on the encoding scheme associated with the downlink control information block. In some examples, the MCS manager 745 may identify the modulation and coding scheme of the one or more transport blocks based on the second numerical quantity of bits, where receiving the one or more transport blocks is based on identifying the modulation and coding scheme.

The HARQ manager 750 may identify one or more hybrid automatic repeat request processes associated with the one or more transport blocks based on a combinatorial number indicated by the downlink control information, the combinatorial number indicating a single combination of the one or more hybrid automatic repeat request processes with the encoding scheme.

The joint decoding manager 755 may decode, jointly according to the encoding scheme, a field of the downlink control information block to identify a first parameter indicating a hybrid automatic repeat request configuration and a second parameter indicating a new data indicator, where decoding the downlink control information block is based on decoding the field. In some examples, the joint decoding manager 755 may decode, jointly accordingly to the encoding scheme, a field to identify a first parameter indicating a modulation and coding scheme configuration and a second parameter indicating a repetition number, where decoding the downlink control information block is based on decoding the field. In some examples, the joint decoding manager 755 may apply the at least one field of the downlink control information block that is jointly decoded to a combinatorial algorithm to determine a first configuration and a second configuration indicated by the at least one field. In some cases, the at least one field of the downlink control information block that is jointly decoded includes a combinatorial index mapping for at least two parameters associated with the one or more transport blocks. In some cases, jointly decoding the at least one field of the downlink control information block is independent of the numerical quantity of the one or more transport blocks.

Figure 8:
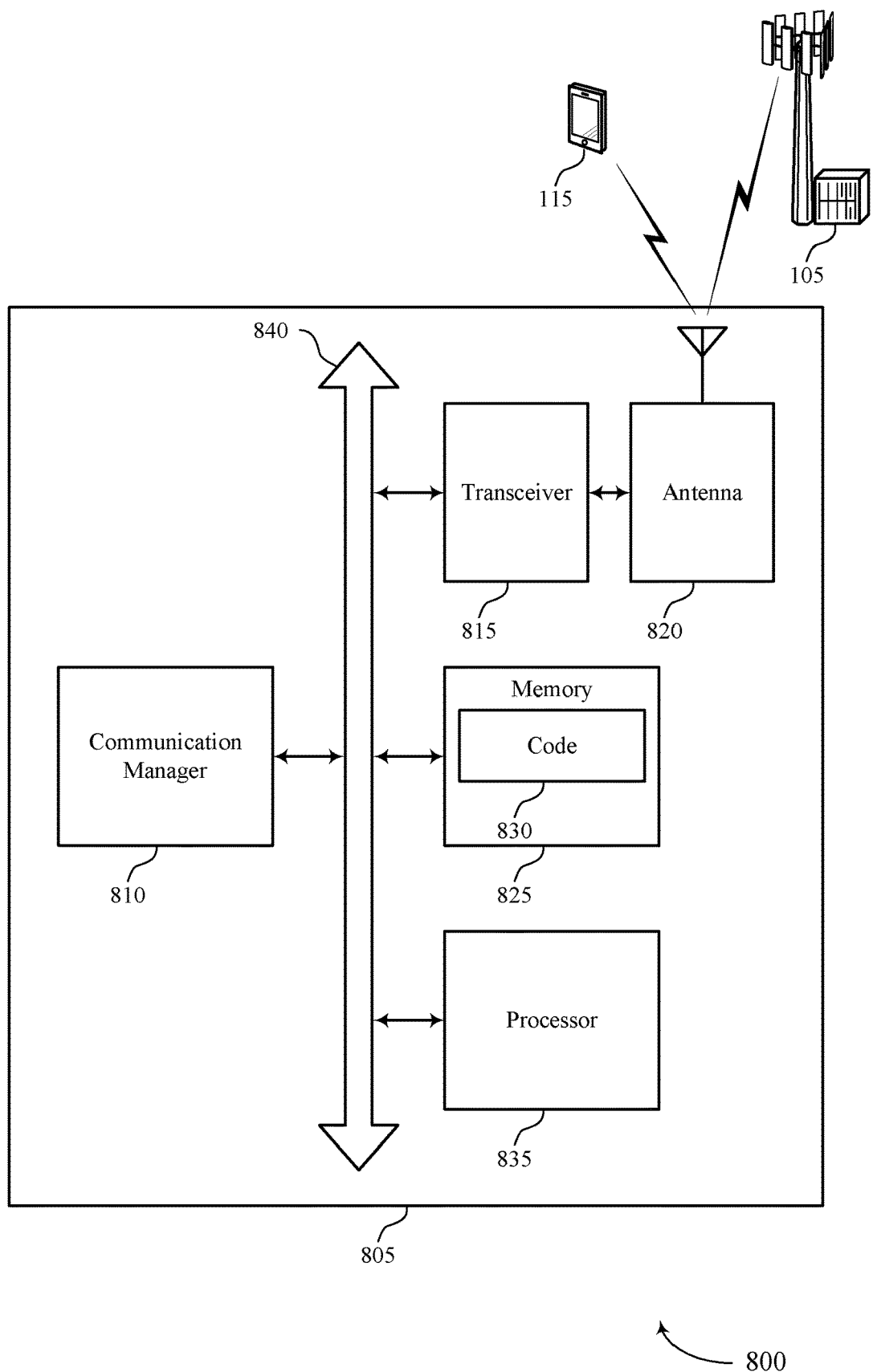
FIG. 8 shows a diagram of a system including a device that supports downlink control information for scheduling one or more transport blocks in accordance with aspects of the present disclosure.

FIG. 8 shows a diagram of a system 800 including a device 805 that supports downlink control information for scheduling one or more transport blocks in accordance with aspects of the present disclosure. The device 805 may be an example of or include the components of device 505, device 605, or a UE 115 as described herein. The device 805 may include components for bi-directional voice and data communications including components for transmitting and receiving communications, including a communication manager 810, a transceiver 815, an antenna 820, memory 825, and a processor 835. These components may be in electronic communication via one or more buses (e.g., bus 840).

The communication manager 810 may perform the features and functions described with reference to the communications managers of FIGS. 4, 5, and 6.

The transceiver 815 may communicate bi-directionally, via one or more antennas, wired, or wireless links as described above. For example, the transceiver 815 may represent a wireless transceiver and may communicate bi-directionally with another wireless transceiver. The transceiver 815 may also include a modem to modulate the packets and provide the modulated packets to the antennas for transmission, and to demodulate packets received from the antennas.

In some cases, the wireless device may include a single antenna 820. However, in some cases the device may have more than one antenna 820, which may be capable of concurrently transmitting or receiving multiple wireless transmissions.

The memory 825 may include RAM and ROM. The memory 825 may store computer-readable, computer-executable code 830 including instructions that, when executed, cause the processor to perform various functions described herein. In some cases, the memory 825 may contain, among other things, a basic input/output system (BIOS) which may control basic hardware or software operation such as the interaction with peripheral components or devices.

The code 830 may include instructions to implement aspects of the present disclosure, including instructions to support wireless communications. The code 830 may be stored in a non-transitory computer-readable medium such as system memory or other type of memory. In some cases, the code 830 may not be directly executable by the processor 835 but may cause a computer (e.g., when compiled and executed) to perform functions described herein.

The processor 835 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 835 may be configured to operate a memory array using a memory controller. In other cases, a memory controller may be integrated into the processor 835. The processor 835 may be configured to execute computer-readable instructions stored in a memory (e.g., the memory 825) to cause the device 805 to perform various functions (e.g., functions or tasks supporting downlink control information for scheduling one or more transport blocks).

Figure 9:
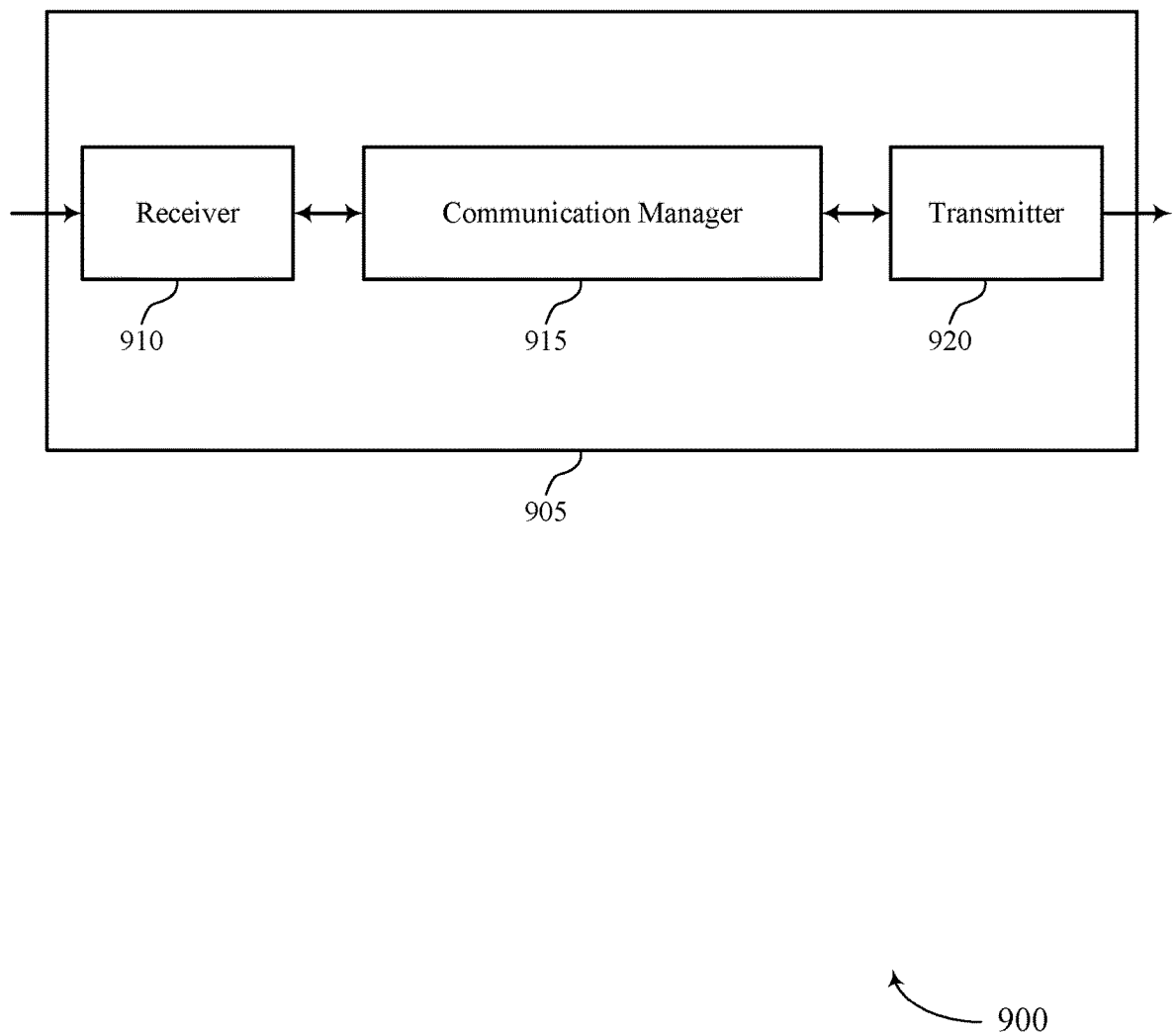
FIGS. 9 and 10 show diagrams of devices that support downlink control information for scheduling one or more transport blocks in accordance with aspects of the present disclosure.

FIG. 9 shows a diagram 900 of a device 905 that supports downlink control information for scheduling one or more transport blocks in accordance with aspects of the present disclosure. The device 905 may be an example of aspects of a base station 105 as described herein. The device 905 may include a receiver 910, a communication manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to downlink control information for scheduling one or more transport blocks, etc.). Information may be passed on to other components of the device 905. The receiver 910 may be an example of aspects of the transceiver 1220 described with reference to FIG. 12. The receiver 910 may utilize a single antenna or a set of antennas.

The communication manager 915 may be configured to encode downlink control information based on a numerical quantity of transport blocks scheduled by the downlink control information. The communication manager 915 may be an example of aspects of the communication manager 1210 described herein.

The communication manager 915, or its sub-components, may be implemented in hardware, code (e.g., software or firmware) executed by a processor, or any combination thereof. If implemented in code executed by a processor, the functions of the communication manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 915, or its sub-components, may be physically located at various positions, including being distributed such that portions of functions are implemented at different physical locations by one or more physical components. In some examples, the communication manager 915, or its sub-components, may be a separate and distinct component in accordance with various aspects of the present disclosure. In some examples, the communication manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
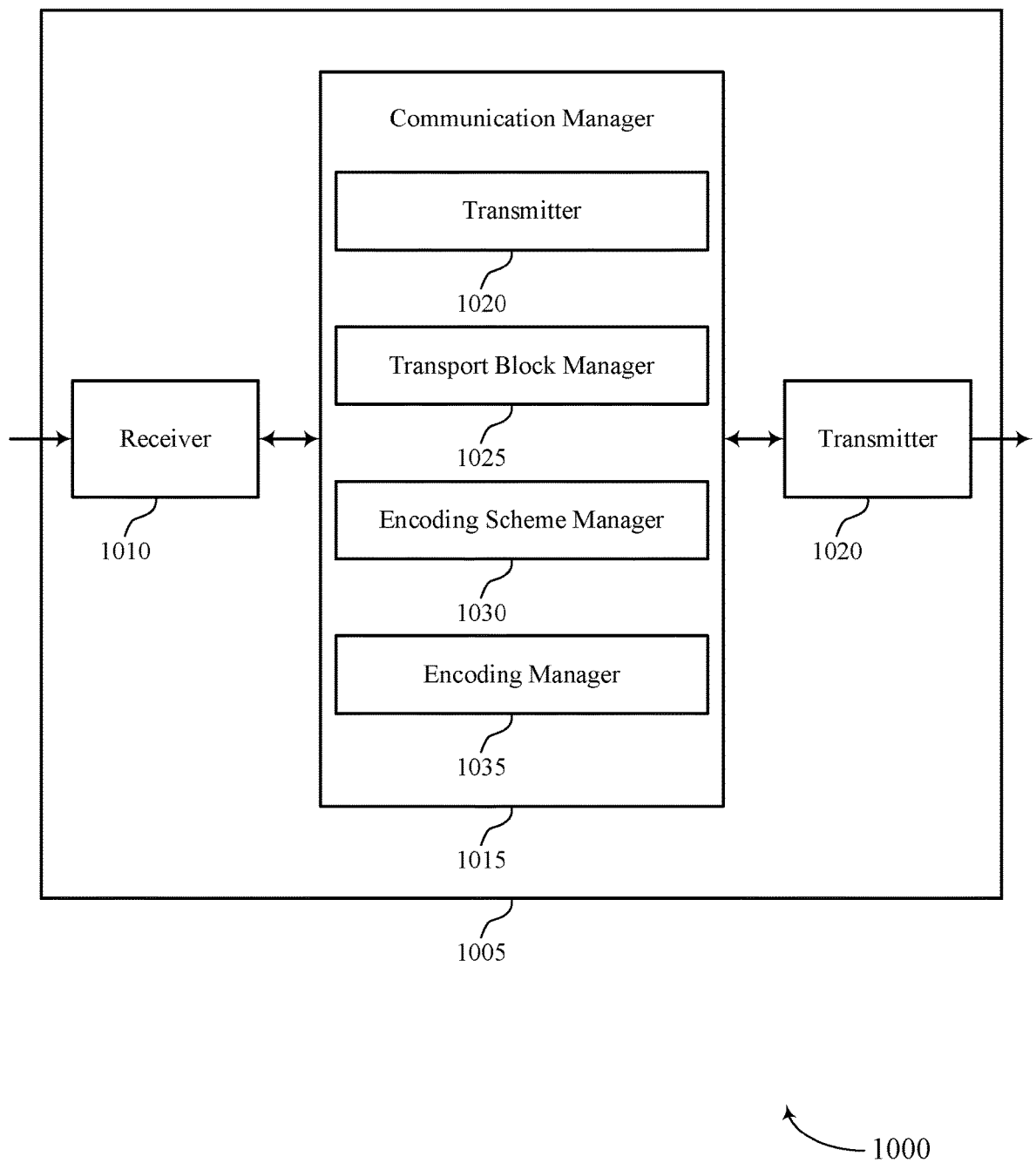

FIG. 10 shows a diagram 1000 of a device 1005 that supports downlink control information for scheduling one or more transport blocks in accordance with aspects of the present disclosure. The device 1005 may be an example of aspects of a device 905, or a base station 115 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to downlink control information for scheduling one or more transport blocks, etc.). Information may be passed on to other components of the device 1005. The receiver 1010 may be an example of aspects of the transceiver 1220 described with reference to FIG. 12. The receiver 1010 may utilize a single antenna or a set of antennas.

The communication manager 1015 may be an example of aspects of the communication manager 915 as described herein. The communication manager 1015 may include a transmitter 1020, a transport block manager 1025, an encoding scheme manager 1030, and an encoding manager 1035. The communication manager 1015 may be an example of aspects of the communication manager 1210 described herein.

The transmitter 1020 may transmit, to the UE, the downlink control information block for the one or more transport blocks to the UE and transmit the one or more transport blocks to the UE based on the downlink control information.

The transport block manager 1025 may determine a numerical quantity of one or more transport blocks for a UE scheduled by downlink control information.

The encoding scheme manager 1030 may select an encoding scheme for the downlink control information based on the numerical quantity of the one or more transport blocks associated with the downlink control information.

The encoding manager 1035 may encode the downlink control information into a downlink control information block for the one or more transport blocks based on the encoding scheme.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1220 described with reference to FIG. 12. The transmitter 1020 may utilize a single antenna or a set of antennas.

Figure 11:
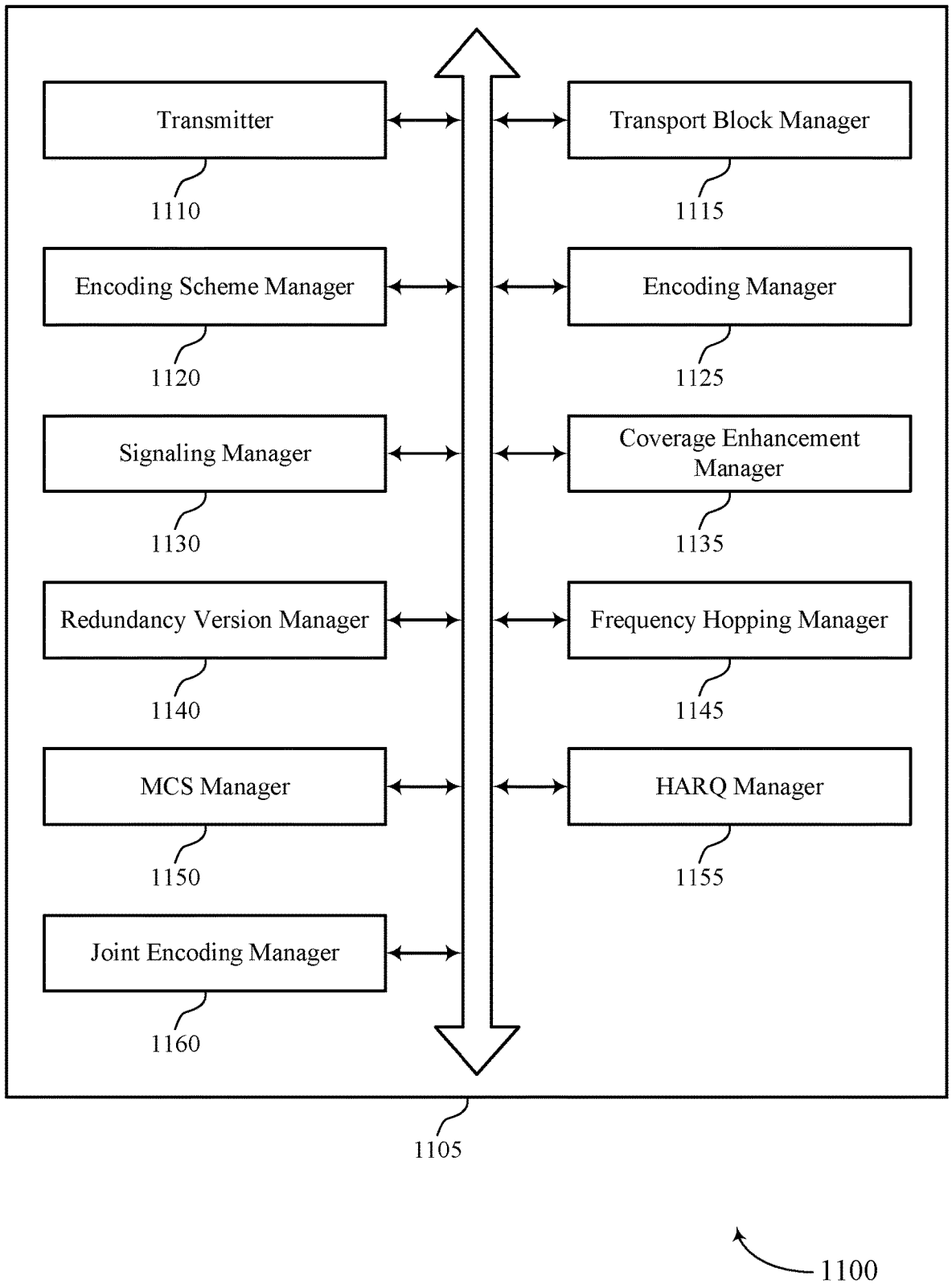
FIG. 11 shows a diagram of a communication manager that supports downlink control information for scheduling one or more transport blocks in accordance with aspects of the present disclosure.

FIG. 11 shows a diagram 1100 of a communication manager 1105 that supports downlink control information for scheduling one or more transport blocks in accordance with aspects of the present disclosure. The communication manager 1105 may be an example of aspects of a communication manager 915, a communication manager 1015, or a communication manager 1210 described herein. The communication manager 1105 may include a transmitter 1110, a transport block manager 1115, an encoding scheme manager 1120, an encoding manager 1125, a signaling manager 1130, a coverage enhancement manager 1135, a redundancy version manager 1140, a frequency hopping manager 1145, a MCS manager 1150, a HARQ manager 1155, and a joint encoding manager 1160. Each of these modules may communicate, directly or indirectly, with one another (e.g., via one or more buses).

The transmitter 1110 may transmit, to the UE, the downlink control information block for the one or more transport blocks to the UE. In some examples, the transmitter 1110 may transmit the one or more transport blocks to the UE based on the downlink control information.

In some cases, the transmitter 1110 may transmit signals generated by other components of the communication manager 1105. In some examples, the transmitter 1110 may be collocated with a transmitter 1110 in a transceiver module. For example, the transmitter 1110 may be an example of aspects of the transceiver 1120 described with reference to FIG. 11. The transmitter 1110 may utilize a single antenna or a set of antennas.

The transport block manager 1115 may determine a numerical quantity of one or more transport blocks for a UE scheduled by downlink control information. In some cases, the field is different lengths for different numerical quantities of the one or more transport blocks scheduled by the downlink control information. In some cases, the field includes a prefix-free encoded value for a first portion of the numerical quantities of the one or more transport blocks scheduled by the downlink control information. In some cases, the field includes a non-prefix-free encoded value for a second portion of the numerical quantities of the one or more transport blocks scheduled by the downlink control information. In some examples, the transport block manager 1115 may identify that the value of the field includes a non-prefix-free encoding value and may shift a value of a parameter indicating a hybrid automatic repeat request configuration based on identifying that the value of the field includes a non-prefix-encoding value, where selecting the encoding scheme is based on shifting the value of the parameter.

The encoding scheme manager 1120 may select an encoding scheme for the downlink control information based on the numerical quantity of the one or more transport blocks associated with the downlink control information.

The encoding manager 1125 may encode the downlink control information into a downlink control information block for the one or more transport blocks based on the encoding scheme.

The signaling manager 1130 may identify a value of a field of the downlink control information for indicating the numerical quantity, where encoding the downlink control information into the downlink control information block is based on identifying the value. In some examples, the signaling manager 1130 may identify a value for one or more fields of the downlink control information for indicating one or more configurations about the one or more transport blocks based on the numerical quantity and one or more desired configurations of the one or more transport blocks, where encoding the downlink control information into the downlink control information block is based on identifying the value.

The coverage enhancement manager 1135 may identify a coverage enhancement mode associated with the UE, where selecting the encoding scheme for the downlink control information is based on the coverage enhancement mode associated with the UE.

The redundancy version manager 1140 may identify a redundancy version for the one or more transport blocks to indicate in the downlink control information based on the numerical quantity of the one or more transport blocks, where encoding the downlink control information is based on identifying the redundancy version. In some examples, the redundancy version manager 1140 may omit an indicator of a redundancy version from the downlink control information based on the numerical quantity, where encoding the downlink control information is based on omitting the indicator of the redundancy version from the downlink control information. In some cases, the redundancy version indicated in the downlink control information includes a common redundancy version for the one or more transport blocks based on the numerical quantity.

The frequency hopping manager 1145 may identify a field of the downlink control information to indicate a frequency hopping configuration for the one or more transport blocks based on the numerical quantity of the one or more transport blocks, where encoding the downlink control information is based on the frequency hopping configuration. The frequency hopping manager 1145 may omit an indicator of a frequency hopping configuration from the downlink control information based at least in part on the numerical quantity, where encoding the downlink control information is based at least in part on omitting the indicator of the frequency hopping configuration from the downlink control information.

The MCS manager 1150 may identify a second numerical quantity of bits of the downlink control information for indicating a modulation and coding scheme of the one or more transport blocks based on the numerical quantity of the one or more transport blocks associated with the downlink control information, where encoding the downlink control information is based on identifying the second numerical quantity of bits of the downlink control information for indicating the modulation and coding scheme. In some examples, the MCS manager 1150 may identify a range of possible modulation and scheme configurations associated with the one or more transport blocks, where identifying the second numerical quantity of bits is based on identifying the range of possible modulation and coding scheme configurations.

The HARQ manager 1155 may assign a unique combinatorial number to each possible combination of hybrid automatic repeat request processes with the numerical quantity of the one or more transport blocks associated with the downlink control information, where the downlink control information includes the unique combinatorial number.

The joint encoding manager 1160 may encode, jointly according to the encoding scheme, a field of the downlink control information block to identify a first parameter indicating a hybrid automatic repeat request configuration and a second parameter indicating a new data indicator, where encoding the downlink control information block is based on encoding the field. In some examples, the joint encoding manager 1160 may encode, jointly according to the encoding scheme, a field of the downlink control information block to identify a first parameter indicating a modulation and coding scheme configuration and a second parameter indicating a repetition number, where encoding the downlink control information block is based on encoding the field. In some examples, determining a combinatorial index mapping for the at least two parameters of the one or more transport blocks, where the at least one field of the downlink control information block that is jointly encoded includes the combinatorial index mapping. In some examples, the joint encoding manager 1160 may apply a first parameter and a second parameter to a combinatorial algorithm to determine a combinatorial index mapping for the at least one field of the downlink control information block that is jointly encoded. In some examples, jointly decoding the at least one field of the downlink control information block is independent of the numerical quantity of the one or more transport blocks.

Figure 12:
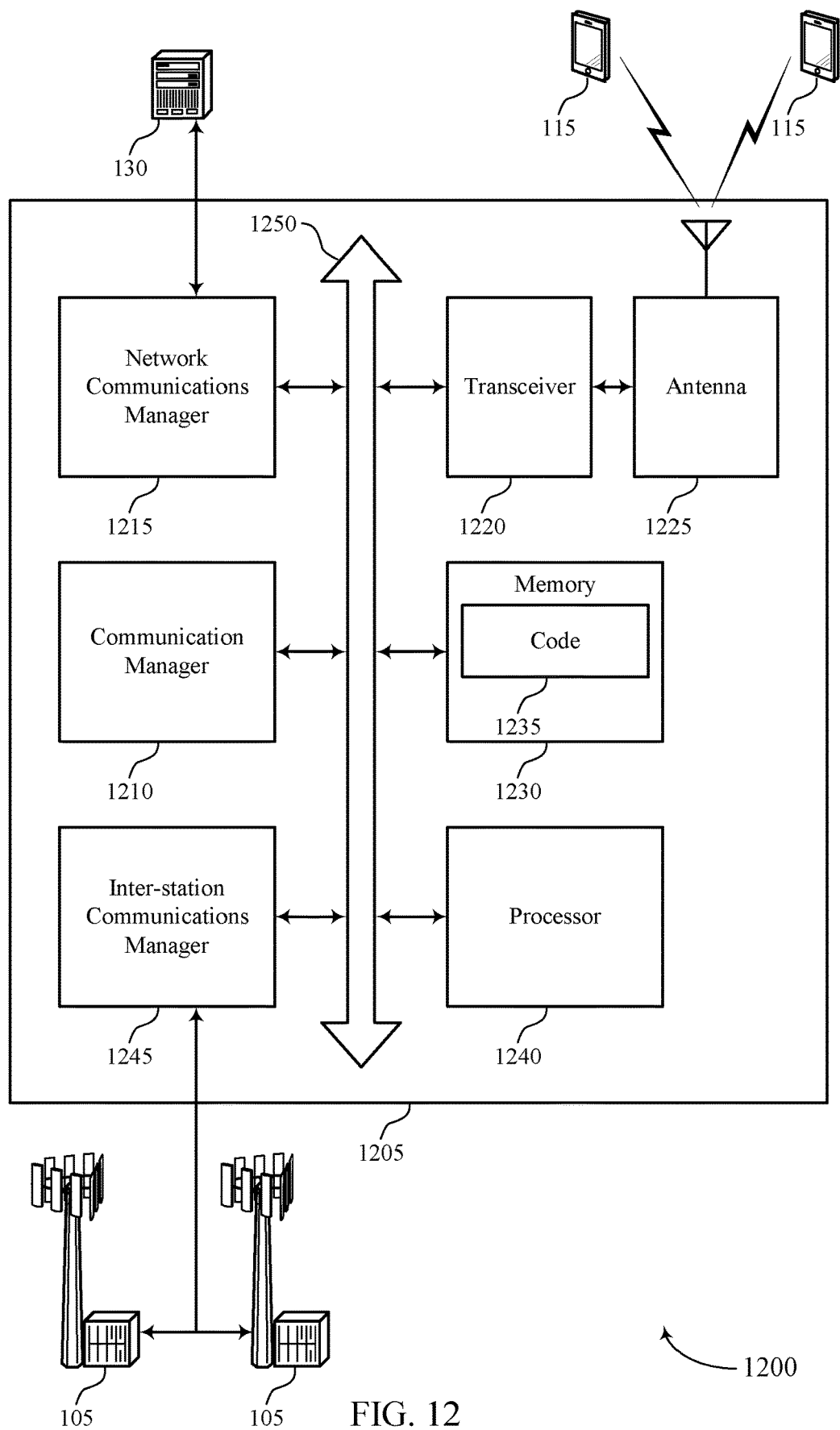
FIG. 12 shows a diagram of a system including a device that supports downlink control information for scheduling one or more transport blocks in accordance with aspects of the present disclosure.

FIG. 12 shows a diagram of a system 1200 including a device 1205 that supports downlink control information for scheduling one or more transport blocks in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communication manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communication manager 1210 may perform the features and functions described with reference to the communications managers of FIGS. 8, 9, and 10.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting downlink control information for scheduling one or more transport blocks).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

Figure 13:
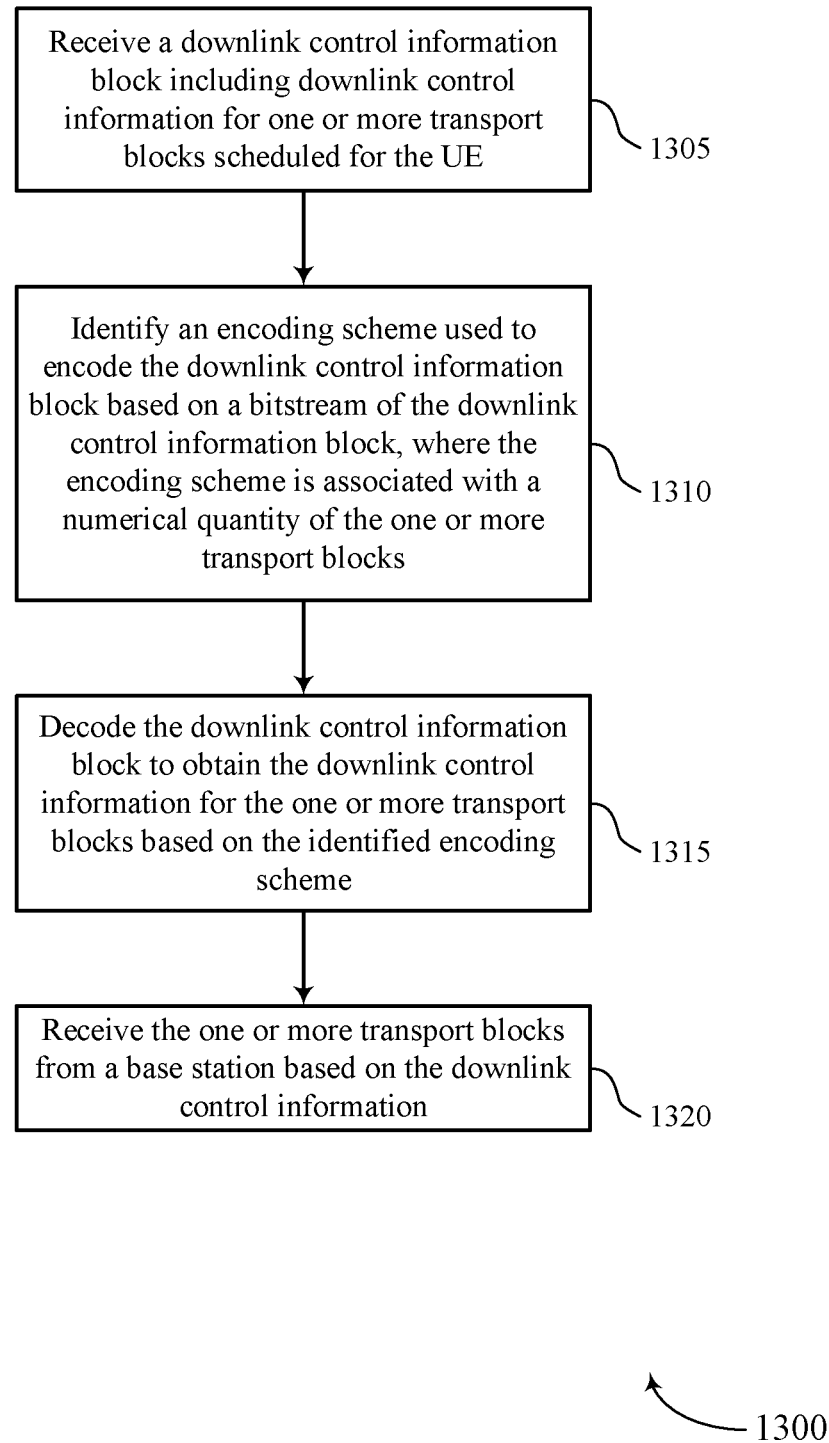
FIGS. 13 through 16 show flowcharts illustrating methods that support downlink control information for scheduling one or more transport blocks in accordance with aspects of the present disclosure.

FIG. 13 shows a flowchart illustrating a method 1300 that supports downlink control information for scheduling one or more transport blocks in accordance with aspects of the present disclosure. The operations of method 1300 may be implemented by a UE 115 or its components as described herein. For example, the operations of method 1300 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1305, the UE may receive a downlink control information block including downlink control information for one or more transport blocks scheduled for the UE. The operations of 1305 may be performed according to the methods described herein. In some examples, aspects of the operations of 1305 may be performed by a Receiver as described with reference to FIGS. 5 through 8.

At 1310, the UE may identify an encoding scheme used to encode the downlink control information block based on a bitstream of the downlink control information block, where the encoding scheme is associated with a numerical quantity of the one or more transport blocks. The operations of 1310 may be performed according to the methods described herein. In some examples, aspects of the operations of 1310 may be performed by a transport block manager as described with reference to FIGS. 5 through 8.

At 1315, the UE may decode the downlink control information block to obtain the downlink control information for the one or more transport blocks based on the identified encoding scheme. The operations of 1315 may be performed according to the methods described herein. In some examples, aspects of the operations of 1315 may be performed by a decoding manager as described with reference to FIGS. 5 through 8.

At 1320, the UE may receive the one or more transport blocks from a base station based on the downlink control information. The operations of 1320 may be performed according to the methods described herein. In some examples, aspects of the operations of 1320 may be performed by a Receiver as described with reference to FIGS. 5 through 8.

Figure 14:
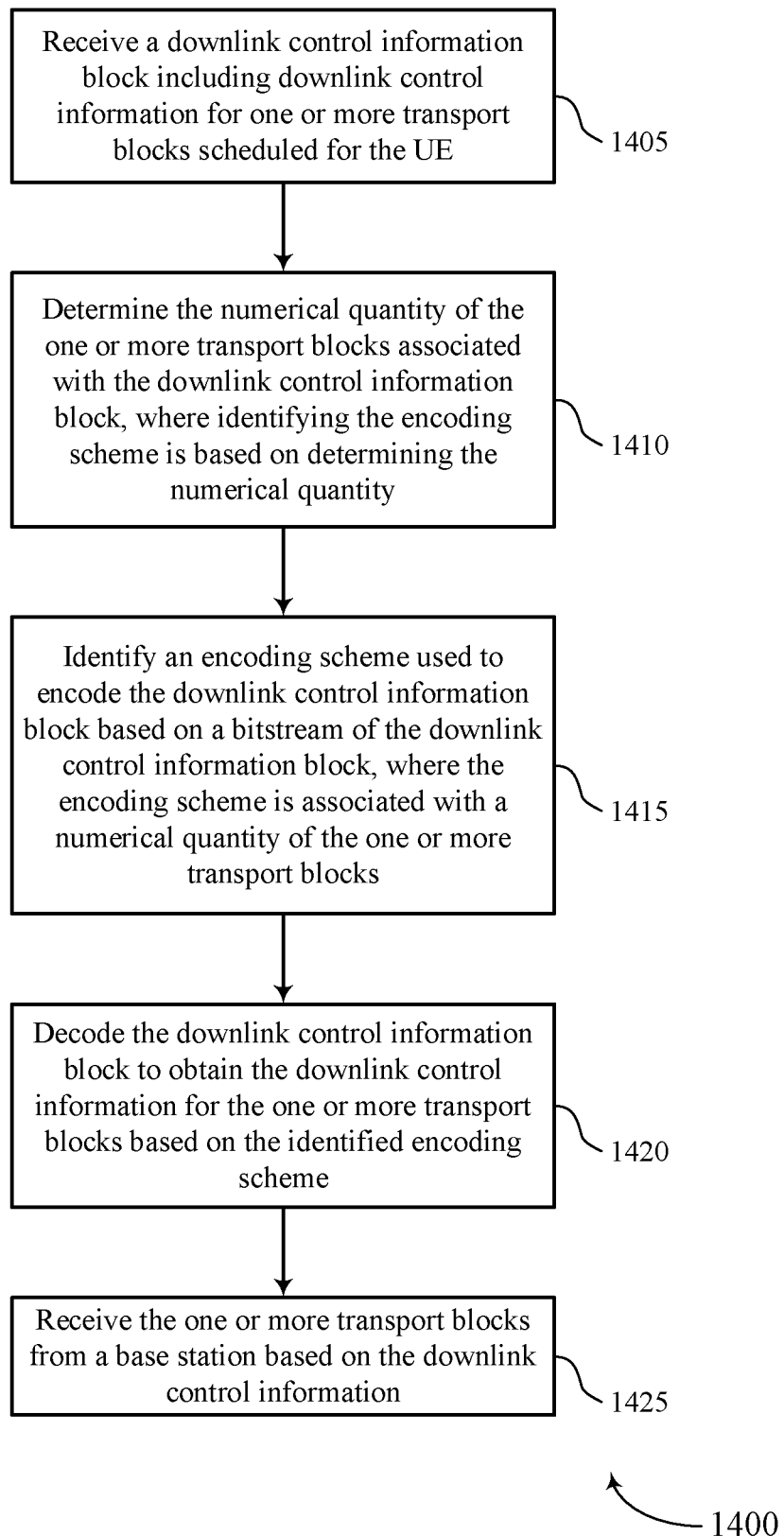

FIG. 14 shows a flowchart illustrating a method 1400 that supports downlink control information for scheduling one or more transport blocks in accordance with aspects of the present disclosure. The operations of method 1400 may be implemented by a UE 115 or its components as described herein. For example, the operations of method 1400 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1405, the UE may receive a downlink control information block including downlink control information for one or more transport blocks scheduled for the UE. The operations of 1405 may be performed according to the methods described herein. In some examples, aspects of the operations of 1405 may be performed by a Receiver as described with reference to FIGS. 5 through 8.

At 1410, the UE may determine the numerical quantity of the one or more transport blocks associated with the downlink control information block, where identifying the encoding scheme is based on determining the numerical quantity. The operations of 1410 may be performed according to the methods described herein. In some examples, aspects of the operations of 1410 may be performed by a transport block manager as described with reference to FIGS. 5 through 8.

At 1415, the UE may identify an encoding scheme used to encode the downlink control information block based on a bitstream of the downlink control information block, where the encoding scheme is associated with a numerical quantity of the one or more transport blocks. The operations of 1415 may be performed according to the methods described herein. In some examples, aspects of the operations of 1415 may be performed by a transport block manager as described with reference to FIGS. 5 through 8.

At 1420, the UE may decode the downlink control information block to obtain the downlink control information for the one or more transport blocks based on the identified encoding scheme. The operations of 1420 may be performed according to the methods described herein. In some examples, aspects of the operations of 1420 may be performed by a decoding manager as described with reference to FIGS. 5 through 8.

At 1425, the UE may receive the one or more transport blocks from a base station based on the downlink control information. The operations of 1425 may be performed according to the methods described herein. In some examples, aspects of the operations of 1425 may be performed by a Receiver as described with reference to FIGS. 5 through 8.

Figure 15:
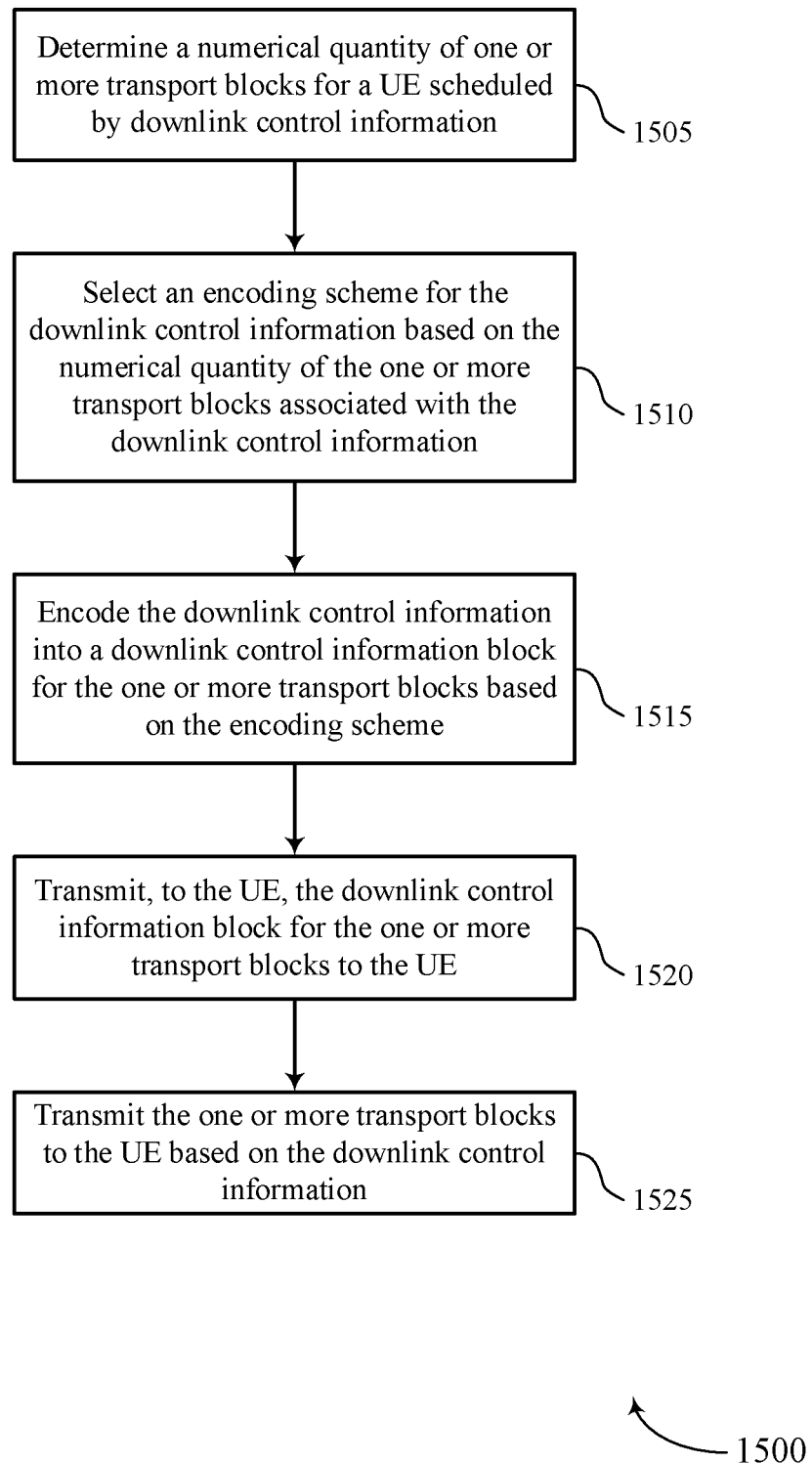

FIG. 15 shows a flowchart illustrating a method 1500 that supports downlink control information for scheduling one or more transport blocks in accordance with aspects of the present disclosure. The operations of method 1500 may be implemented by a base station 105 or its components as described herein. For example, the operations of method 1500 may be performed by a communication manager as described with reference to FIGS. 9 through 12. In some examples, a base station may execute a set of instructions to control the functional elements of the base station to perform the described functions. Additionally or alternatively, a base station may perform aspects of the described functions using special-purpose hardware.

At 1505, the base station may determine a numerical quantity of one or more transport blocks for a UE scheduled by downlink control information. The operations of 1505 may be performed according to the methods described herein. In some examples, aspects of the operations of 1505 may be performed by a transport block manager as described with reference to FIGS. 9 through 12.

At 1510, the base station may select an encoding scheme for the downlink control information based on the numerical quantity of the one or more transport blocks associated with the downlink control information. The operations of 1510 may be performed according to the methods described herein. In some examples, aspects of the operations of 1510 may be performed by an encoding scheme manager as described with reference to FIGS. 9 through 12.

At 1515, the base station may encode the downlink control information into a downlink control information block for the one or more transport blocks based on the encoding scheme. The operations of 1515 may be performed according to the methods described herein. In some examples, aspects of the operations of 1515 may be performed by an encoding manager as described with reference to FIGS. 9 through 12.

At 1520, the base station may transmit, to the UE, the downlink control information block for the one or more transport blocks to the UE. The operations of 1520 may be performed according to the methods described herein. In some examples, aspects of the operations of 1520 may be performed by a Transmitter as described with reference to FIGS. 9 through 12.

At 1525, the base station may transmit the one or more transport blocks to the UE based on the downlink control information. The operations of 1525 may be performed according to the methods described herein. In some examples, aspects of the operations of 1525 may be performed by a Transmitter as described with reference to FIGS. 9 through 12.

Figure 16:
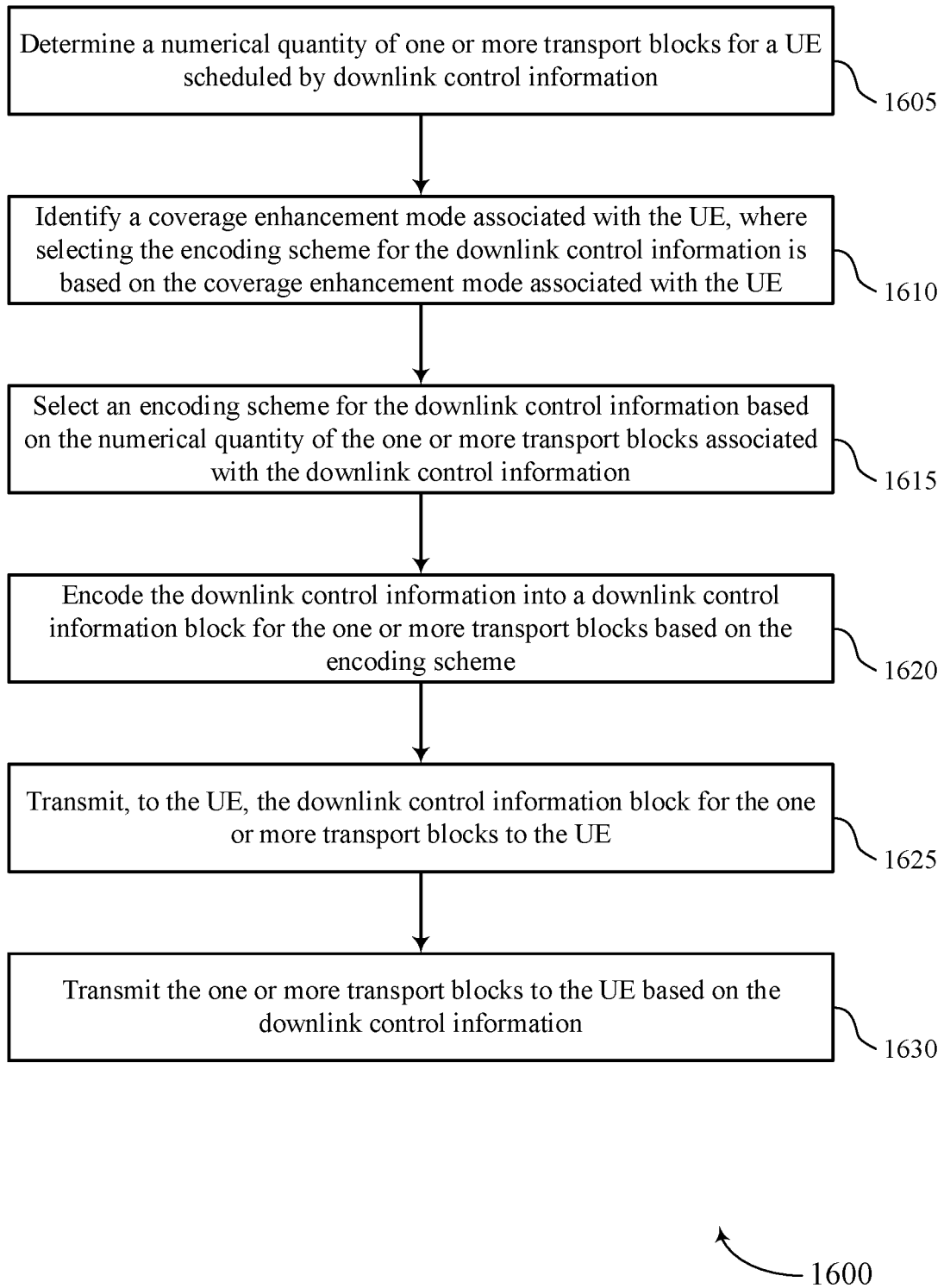

FIG. 16 shows a flowchart illustrating a method 1600 that supports downlink control information for scheduling one or more transport blocks in accordance with aspects of the present disclosure. The operations of method 1600 may be implemented by a base station 105 or its components as described herein. For example, the operations of method 1600 may be performed by a communication manager as described with reference to FIGS. 9 through 12. In some examples, a base station may execute a set of instructions to control the functional elements of the base station to perform the described functions. Additionally or alternatively, a base station may perform aspects of the described functions using special-purpose hardware.

At 1605, the base station may determine a numerical quantity of one or more transport blocks for a UE scheduled by downlink control information. The operations of 1605 may be performed according to the methods described herein. In some examples, aspects of the operations of 1605 may be performed by a transport block manager as described with reference to FIGS. 9 through 12.

At 1610, the base station may identify a coverage enhancement mode associated with the UE, where selecting the encoding scheme for the downlink control information is based on the coverage enhancement mode associated with the UE. The operations of 1610 may be performed according to the methods described herein. In some examples, aspects of the operations of 1610 may be performed by a coverage enhancement manager as described with reference to FIGS. 9 through 12.

At 1615, the base station may select an encoding scheme for the downlink control information based on the numerical quantity of the one or more transport blocks associated with the downlink control information. The operations of 1615 may be performed according to the methods described herein. In some examples, aspects of the operations of 1615 may be performed by an encoding scheme manager as described with reference to FIGS. 9 through 12.

At 1620, the base station may encode the downlink control information into a downlink control information block for the one or more transport blocks based on the encoding scheme. The operations of 1620 may be performed according to the methods described herein. In some examples, aspects of the operations of 1620 may be performed by an encoding manager as described with reference to FIGS. 9 through 12.

At 1625, the base station may transmit, to the UE, the downlink control information block for the one or more transport blocks to the UE. The operations of 1625 may be performed according to the methods described herein. In some examples, aspects of the operations of 1625 may be performed by a Transmitter as described with reference to FIGS. 9 through 12.

At 1630, the base station may transmit the one or more transport blocks to the UE based on the downlink control information. The operations of 1630 may be performed according to the methods described herein. In some examples, aspects of the operations of 1630 may be performed by a Transmitter as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a downlink control information block comprising downlink control information for one or more transport blocks scheduled for the UE;
   identifying an encoding scheme used to encode the downlink control information block based at least in part on a bitstream of the downlink control information block, wherein the encoding scheme is associated with a numerical quantity of the one or more transport blocks;
   decoding the downlink control information block to obtain the downlink control information for the one or more transport blocks based at least in part on the identified encoding scheme; and
   receiving the one or more transport blocks from an access network entity based at least in part on the downlink control information.

2. A method for wireless communications at an access network entity, comprising:
   determining a numerical quantity of one or more transport blocks for a user equipment (UE) scheduled by downlink control information;
   selecting an encoding scheme for the downlink control information based at least in part on the numerical quantity of the one or more transport blocks associated with the downlink control information;
   encoding the downlink control information into a downlink control information block for the one or more transport blocks based at least in part on the encoding scheme;
   transmitting, to the UE, the downlink control information block for the one or more transport blocks to the UE; and
   transmitting the one or more transport blocks to the UE based at least in part on the downlink control information.

3. An apparatus for wireless communications at a user equipment (UE), comprising:
   a processor,
   memory coupled with the processor, and
   instructions stored in the memory and executable by the processor to cause the apparatus to:
      receive a downlink control information block comprising downlink control information for one or more transport blocks scheduled for the UE;
      identify an encoding scheme used to encode the downlink control information block based at least in part on a bitstream of the downlink control information block, wherein the encoding scheme is associated with a numerical quantity of the one or more transport blocks;
      decode the downlink control information block to obtain the downlink control information for the one or more transport blocks based at least in part on the identified encoding scheme; and receive the one or more transport blocks from an access network entity based at least in part on the downlink control information.

4. The apparatus of claim 3, wherein the instructions are further executable by the processor to cause the apparatus to:
determine the numerical quantity of the one or more transport blocks associated with the downlink control information block, wherein identifying the encoding scheme is based at least in part on determining the numerical quantity.

5. The apparatus of claim 3, wherein the instructions are further executable by the processor to cause the apparatus to:
identify a field of the downlink control information block that indicates the encoding scheme, wherein identifying the encoding scheme is based at least in part on the field.

6. The apparatus of claim 3, wherein the instructions are further executable by the processor to cause the apparatus to:
determine the encoding scheme or the numerical quantity implicitly from the downlink control information block for indicating one or more configurations about the one or more transport blocks, wherein identifying the numerical quantity is based at least in part on determining the encoding scheme from the downlink control information block.

7. The apparatus of claim 6, wherein the downlink control information block uniquely determines the numerical quantity of transport blocks.

8. The apparatus of claim 6, wherein one or more fields of the downlink control information for determining the encoding scheme are jointly decoded according to the encoding scheme, wherein each possible output of the encoding scheme corresponds to a jointly valid combination of the one or more fields.

9. The apparatus of claim 3, wherein the instructions are further executable by the processor to cause the apparatus to:
identify a coverage enhancement mode of the UE, wherein decoding the downlink control information block to obtain the downlink control information is based at least in part on the coverage enhancement mode of the UE.

10. The apparatus of claim 3, wherein the instructions are further executable by the processor to cause the apparatus to:
identify a redundancy version for the one or more transport blocks indicated in the downlink control information based at least in part on the identified encoding scheme, wherein receiving the one or more transport blocks is based at least in part on identifying the redundancy version.

11. The apparatus of claim 10, wherein the redundancy version indicated in the downlink control information comprises a common redundancy version for the one or more transport blocks based at least in part on the numerical quantity.

12. The apparatus of claim 10, wherein the instructions are further executable by the processor to cause the apparatus to:
determine that the downlink control information does not include a field to indicate the redundancy version based at least in part on the encoding scheme, wherein the instructions to identify the redundancy version are executable by the processor to cause the apparatus to identify a default redundancy version.

13. The apparatus of claim 3, wherein the instructions are further executable by the processor to cause the apparatus to:
identify a field of the downlink control information to indicate a frequency hopping configuration for the one or more transport blocks based at least in part on the encoding scheme, wherein receiving the one or more transport blocks is based at least in part on the frequency hopping configuration indicated by the downlink control information.

14. The apparatus of claim 3, wherein the instructions are further executable by the processor to cause the apparatus to:
identify a second numerical quantity of bits of the downlink control information for indicating a modulation and coding scheme of the one or more transport blocks based at least in part on the encoding scheme associated with the downlink control information block; and
identify the modulation and coding scheme of the one or more transport blocks based at least in part on the second numerical quantity of bits, wherein receiving the one or more transport blocks is based at least in part on identifying the modulation and coding scheme.

15. The apparatus of claim 14, wherein a range of possible modulation and coding scheme configurations associated with the one or more transport blocks is based at least in part on the second numerical quantity of bits of the downlink control information for indicating the modulation and coding scheme.

16. The apparatus of claim 3, wherein the instructions are further executable by the processor to cause the apparatus to:
identify one or more hybrid automatic repeat request processes associated with the one or more transport blocks based at least in part on a combinatorial number indicated by the downlink control information, the combinatorial number indicating a single combination of the one or more hybrid automatic repeat request processes with the encoding scheme.

17. The apparatus of claim 3, wherein at least one field of the downlink control information block is jointly decoded according to the encoding scheme, wherein each possible output of the encoding scheme corresponds to a jointly valid combination of at least two parameters.

18. The apparatus of claim 17, wherein the instructions are further executable by the processor to cause the apparatus to:
decode, jointly according to the encoding scheme, a field of the downlink control information block to identify a first parameter indicating a hybrid automatic repeat request configuration and a second parameter indicating a new data indicator, wherein decoding the downlink control information block is based at least in part on decoding the field.

19. The apparatus of claim 17, wherein the instructions are further executable by the processor to cause the apparatus to:
decode, jointly accordingly to the encoding scheme, a field to identify a first parameter indicating a modulation and coding scheme configuration and a second parameter indicating a repetition number, wherein decoding the downlink control information block is based at least in part on decoding the field.

20. The apparatus of claim 17, wherein the at least one field of the downlink control information block that is jointly decoded comprises a combinatorial index mapping for at least two parameters associated with the one or more transport blocks.

21. The apparatus of claim 17, wherein the instructions are further executable by the processor to cause the apparatus to:

apply the at least one field of the downlink control information block that is jointly decoded to a combinatorial algorithm to determine a first configuration and a second configuration indicated by the at least one field.

22. The apparatus of claim 3, wherein the instructions are further executable by the processor to cause the apparatus to:

determine that the downlink control information does not include a field to indicate a frequency hopping configuration for the one or more transport blocks based at least in part on the encoding scheme; and identify the frequency hopping configuration for the one or more transport blocks based at least in part on a radio resource configuration of the UE, wherein receiving the one or more transport blocks is based at least in part on identifying a redundancy version.

23. The apparatus of claim 3, wherein the instructions are further executable by the processor to cause the apparatus to:

identify a value of a field of the downlink control information block that indicates the numerical quantity of the one or more transport blocks scheduled by the downlink control information, wherein identifying the encoding scheme is based at least in part on identifying the value of the field.

24. The apparatus of claim 23, wherein the field is different lengths for different numerical quantities of the one or more transport blocks scheduled by the downlink control information.

25. The apparatus of claim 23, wherein:

the field comprises a prefix-free encoded value for a first portion of numerical quantities of the one or more transport blocks scheduled by the downlink control information; and the field comprises a non-prefix-free encoded value for a second portion of the numerical quantities of the one or more transport blocks scheduled by the downlink control information.

26. The apparatus of claim 23, wherein the instructions are further executable by the processor to cause the apparatus to:

identify that the value of the field comprises a non-prefix-free encoding value; and identify a value of one or more bits outside of the field based at least in part on identifying that the value of the field comprises the non-prefix-free encoding value, wherein identifying the encoding scheme is based at least in part on identifying the value of the one or more bits outside of the field.

27. The apparatus of claim 26, wherein the instructions are further executable by the processor to cause the apparatus to:

identify that a first bit of the value of the field comprises a first value, wherein identifying that the value of the field comprises the non-prefix-free encoding value based at least in part on identifying that the first bit of the value of the field comprises the first value.

28. The apparatus of claim 26, wherein the one or more bits are part of a field indicating a hybrid automatic repeat request configuration.

29. An apparatus for wireless communications at an access network entity, comprising:

a processor, memory coupled with the processor, and instructions stored in the memory and executable by the processor to cause the apparatus to:

determine a numerical quantity of one or more transport blocks for a user equipment (UE) scheduled by downlink control information;

select an encoding scheme for the downlink control information based at least in part on the numerical quantity of the one or more transport blocks associated with the downlink control information;

encode the downlink control information into a downlink control information block for the one or more transport blocks based at least in part on the encoding scheme;

transmit, to the UE, the downlink control information block for the one or more transport blocks to the UE; and transmit the one or more transport blocks to the UE based at least in part on the downlink control information.

30. The apparatus of claim 29, wherein the instructions are further executable by the processor to cause the apparatus to:

identify a value of a field of the downlink control information for indicating the numerical quantity, wherein encoding the downlink control information into the downlink control information block is based at least in part on identifying the value.

31. The apparatus of claim 30, wherein the instructions are further executable by the processor to cause the apparatus to:

identify that the value of the field comprises a non-prefix-free encoding value; and shift a value of a parameter indicating a hybrid automatic repeat request configuration based at least in part on identifying that the value of the field comprises a non-prefix-encoding value, wherein selecting the encoding scheme is based at least in part on shifting the value of the parameter.

32. The apparatus of claim 29, wherein the instructions are further executable by the processor to cause the apparatus to:

identify a value for one or more fields of the downlink control information for indicating one or more configurations about the one or more transport blocks based at least in part on the numerical quantity and one or more desired configurations of the one or more transport blocks, wherein encoding the downlink control information into the downlink control information block is based at least in part on identifying the value.

33. The apparatus of claim 29, wherein the instructions are further executable by the processor to cause the apparatus to:

assign a unique combinatorial number to each possible combination of hybrid automatic repeat request processes with the numerical quantity of the one or more transport blocks associated with the downlink control information, wherein the downlink control information includes the unique combinatorial number.

34. The apparatus of claim 29, wherein at least one field of the downlink control information block is jointly encoded according to the encoding scheme to include values for at least two parameters, wherein each possible output of the encoding scheme corresponds to a jointly valid combination of the at least two parameters.

35. An apparatus for wireless communications at a user equipment (UE), comprising:
- means for receiving a downlink control information block comprising downlink control information for one or more transport blocks scheduled for the UE;
- means for identifying an encoding scheme used to encode the downlink control information block based at least in part on a bitstream of the downlink control information block, wherein the encoding scheme is associated with a numerical quantity of the one or more transport blocks;
- means for decoding the downlink control information block to obtain the downlink control information for the one or more transport blocks based at least in part on the identified encoding scheme; and
- means for receiving the one or more transport blocks from an access network entity based at least in part on the downlink control information.

* * * * *